(12) United States Patent
Ishibashi

(10) Patent No.: US 8,934,124 B2
(45) Date of Patent: Jan. 13, 2015

(54) SYSTEM FOR ASSOCIATING TAG INFORMATION WITH ELECTRONIC DATA UPLOADED TO A SERVER UNIT FROM AN IMAGE PROCESSING APPARATUS, BY AN INTERMEDIARY APPARATUS

(71) Applicant: Brother Kogyo Kabushiki Kaisha, Nagoya-shi, Aichi-ken (JP)

(72) Inventor: Masayuki Ishibashi, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/849,168

(22) Filed: Mar. 22, 2013

(65) Prior Publication Data

US 2014/0071482 A1   Mar. 13, 2014

(30) Foreign Application Priority Data

Sep. 7, 2012   (JP) .................................. 2012-197785

(51) Int. Cl.
| | | |
|---|---|---|
| G06F 15/00 | (2006.01) | |
| G06K 1/00 | (2006.01) | |
| G06F 3/12 | (2006.01) | |
| H04N 1/21 | (2006.01) | |

(52) U.S. Cl.
CPC .................................. *H04N 1/2166* (2013.01)
USPC ........................... 358/1.15; 358/1.13; 358/1.9

(58) Field of Classification Search
None
See application file for complete search history.

(56) References Cited

U.S. PATENT DOCUMENTS

| | | | | |
|---|---|---|---|---|
| 6,760,128 | B2 * | 7/2004 | Jackson et al. | 358/453 |
| 7,333,227 | B2 * | 2/2008 | Seto | 358/1.15 |
| 8,681,350 | B2 * | 3/2014 | Armstrong | 358/1.14 |
| 2003/0035138 | A1 * | 2/2003 | Schilling | 358/1.15 |
| 2003/0189739 | A1 * | 10/2003 | Yamaguchi et al. | 358/527 |
| 2007/0133064 | A1 * | 6/2007 | Itogawa et al. | 358/403 |
| 2011/0040757 | A1 * | 2/2011 | Kossi et al. | 707/737 |
| 2011/0093535 | A1 * | 4/2011 | Takakura et al. | 709/203 |
| 2013/0050728 | A1 * | 2/2013 | Ito | 358/1.13 |

FOREIGN PATENT DOCUMENTS

JP   2007-188479 A   7/2007

* cited by examiner

*Primary Examiner* — Ming Hon
(74) *Attorney, Agent, or Firm* — Merchant & Gould PC

(57) ABSTRACT

An intermediary apparatus includes a communication interface connectable to an image processing apparatus via a first network and also connectable to a service via a second network, and a controller configured to: acquire tagging request information, which is transmitted from the image processing apparatus, for requesting to associate tag data with electronic data which has been uploaded to the service from the image processing apparatus; acquire upload notification information, which is transmitted from the image processing apparatus, indicating that the electronic data has been uploaded from the image processing apparatus to the service; output tagging instruction information for requesting to associate the tag data with the electronic data which has been uploaded from the image processing apparatus and stored in the service in response to acquiring the tagging request information and the upload notification information; and transmit the tagging instruction information to the service via the communication interface.

15 Claims, 24 Drawing Sheets

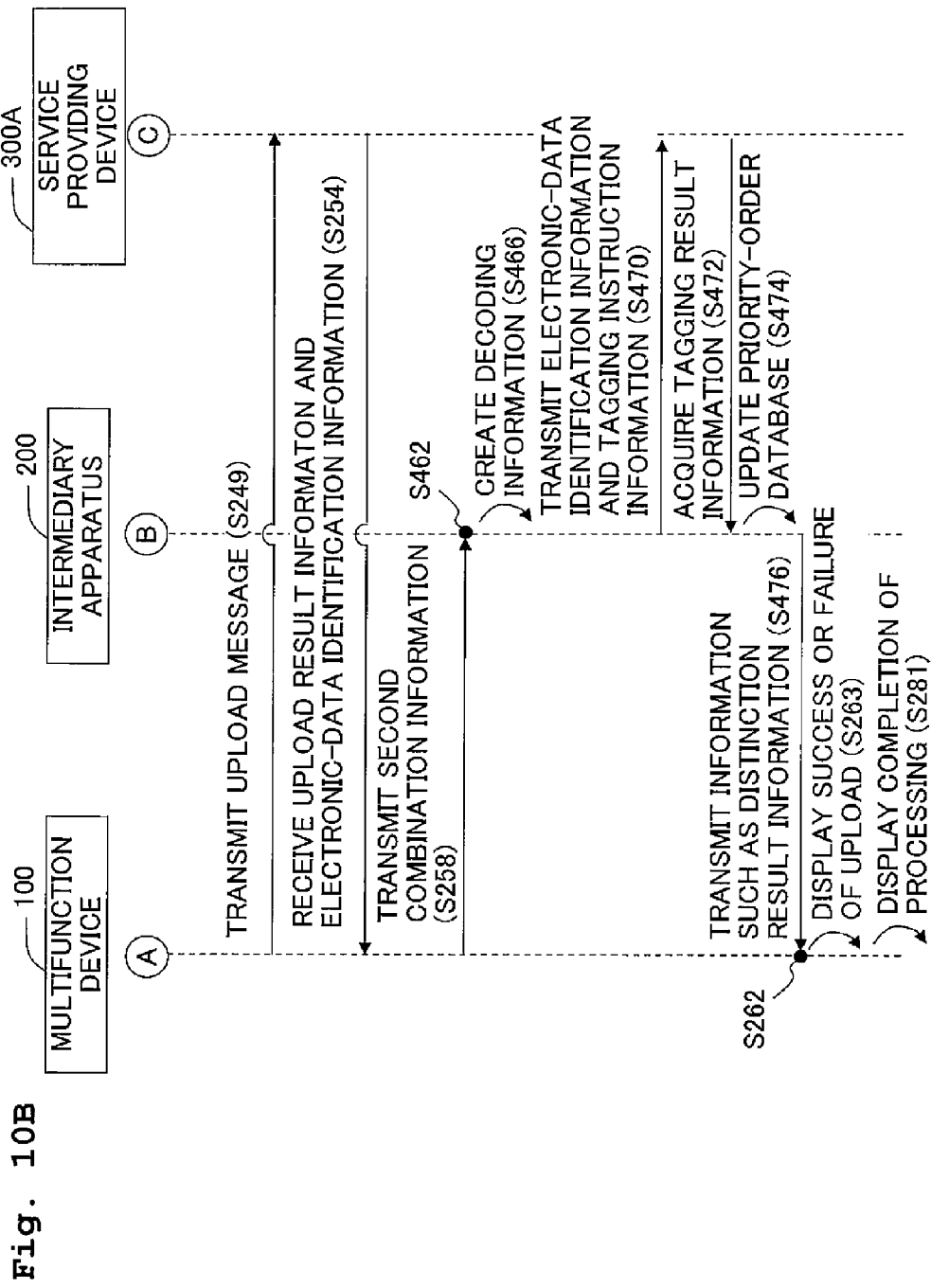

Fig. 14

| FOLDER NAME | FILE NAME | EXTENSION | TAG DATA |
|---|---|---|---|
| ¥¥server¥root¥user001 | dog1234 | .jpg | dog |
| ¥¥server¥root¥user001 | dog_diary05 | .doc | dog |
| ¥¥server¥root¥user001 | dogAB | .jpg | dog, sports festival 03092012 |
| ¥¥server¥root¥user001 | camera_01 | .jpg | sports festival 03092012 |
| ¥¥server¥root¥user001 | camera_02 | .jpg | sports festival 03092012 |

601  602  603  604

SYSTEM FOR ASSOCIATING TAG INFORMATION WITH ELECTRONIC DATA UPLOADED TO A SERVER UNIT FROM AN IMAGE PROCESSING APPARATUS, BY AN INTERMEDIARY APPARATUS

CROSS REFERENCE TO RELATED APPLICATION

The present application claims priority from Japanese Patent Application No. 2012-197785 filed on Sep. 7, 2012, the disclosure of which is incorporated herein by reference in its entirety.

BACKGROUND OF THE INVENTION

1. Field of the Invention

The present invention relates to an intermediary apparatus which is connected to an image processing apparatus and a server unit via networks.

2. Description of the Related Art

In recent years, an electronic-data storage service, which enables to store electronic data in a database provided by a service provider on a network, is in widespread use. For instance, Picasa (registered trademark) web album is an example of such electronic-data storage service. Each of a large number of electronic-data storage services has its own Application Program Interface (hereinafter referred to as "API") which is released by the service provider. By using these APIs which have been released, it is possible to upload to the electronic-data storage service and to download from the electronic-data storage service. Moreover, by using these APIs which have been released, it is possible to associate tag information specified by a user with electronic data which has been uploaded to the electronic-data storage service.

SUMMARY OF THE INVENTION

For carrying out a processing of associating tag information with the electronic data which has been uploaded to the electronic-data storage service by an image processing apparatus, sometimes, a computer program for using the API which has been released by the service provider is to be stored in the image processing apparatus. In such a case, when an attempt is made to deal with a plurality of types of electronic-data storage services, a storage section of the image processing apparatus is required to have a large capacity. Moreover, to cope with a change in specifications of the API disclosed, it takes time and effort, and sometimes expenditure to update a plurality of types of computer programs corresponding to the plurality of APIs released.

According to an aspect of the present invention, there is provided an intermediary apparatus configured to be connectable to an image processing apparatus and to a service configured to store electronic data which has been uploaded, via networks, the intermediary apparatus including: a communication interface configured to be connectable to the image processing apparatus via a first network, and also connectable to the service via a second network; and a controller configured to: acquire tagging request information, which is transmitted from the image processing apparatus, for requesting to associate tag data with electronic data which has been uploaded to the service from the image processing apparatus; acquire upload notification information, which is transmitted from the image processing apparatus, indicating that the electronic data has been uploaded from the image processing apparatus to the service; output tagging instruction information for requesting to associate the tag data with the electronic data which has been uploaded from the image processing apparatus and stored in the service in response to acquiring the tagging request information and the upload notification information; and control the communication interface to transmit the tagging instruction information to the service.

According to the abovementioned arrangement, it is possible to execute a processing of associating tag information with the electronic data which has been uploaded to the service from the image processing apparatus, by the intermediary apparatus. Accordingly, it is possible to eliminate a need to store in the image processing apparatus, a computer program etc. for executing the processing of associating the tag information. Moreover, it is possible to eliminate a need to make the image processing apparatus execute updating of these computer programs. Therefore, it is possible to prevent time and effort, and sometimes expenditure for updating a plurality of types of computer programs corresponding to a plurality of APIs released, in order to cope with a situation which necessitates a large capacity of a storage section of the image processing apparatus, and a change in specifications of the APIs released.

An image processing apparatus for realizing the abovementioned processing is also novel and useful. Moreover, a method, a computer program, and a computer readable recording medium which stores the computer program for realizing the intermediary apparatus and the image processing apparatus, are novel and useful.

BRIEF DESCRIPTION OF THE DRAWINGS

FIGS. 9A, 9B, 10A, and 10B show a sequence diagram indicating an operation example of the service collaboration system.

FIG. 14 is a diagram showing an example of data which is added to electronic data.

DETAILED DESCRIPTION OF THE PREFERRED EMBODIMENTS

An embodiment in which the present invention has been substantiated will be described below by referring to the accompanying diagrams. The diagrams to be referred to will be used for describing technological features which the present invention adopts. Structures of apparatuses, a flowchart of each processing which will be described below are only examples for describing, and the present invention is not limited to the structures and the flowcharts described below.

<Outline of Service Collaboration System 10>

Figure 1:
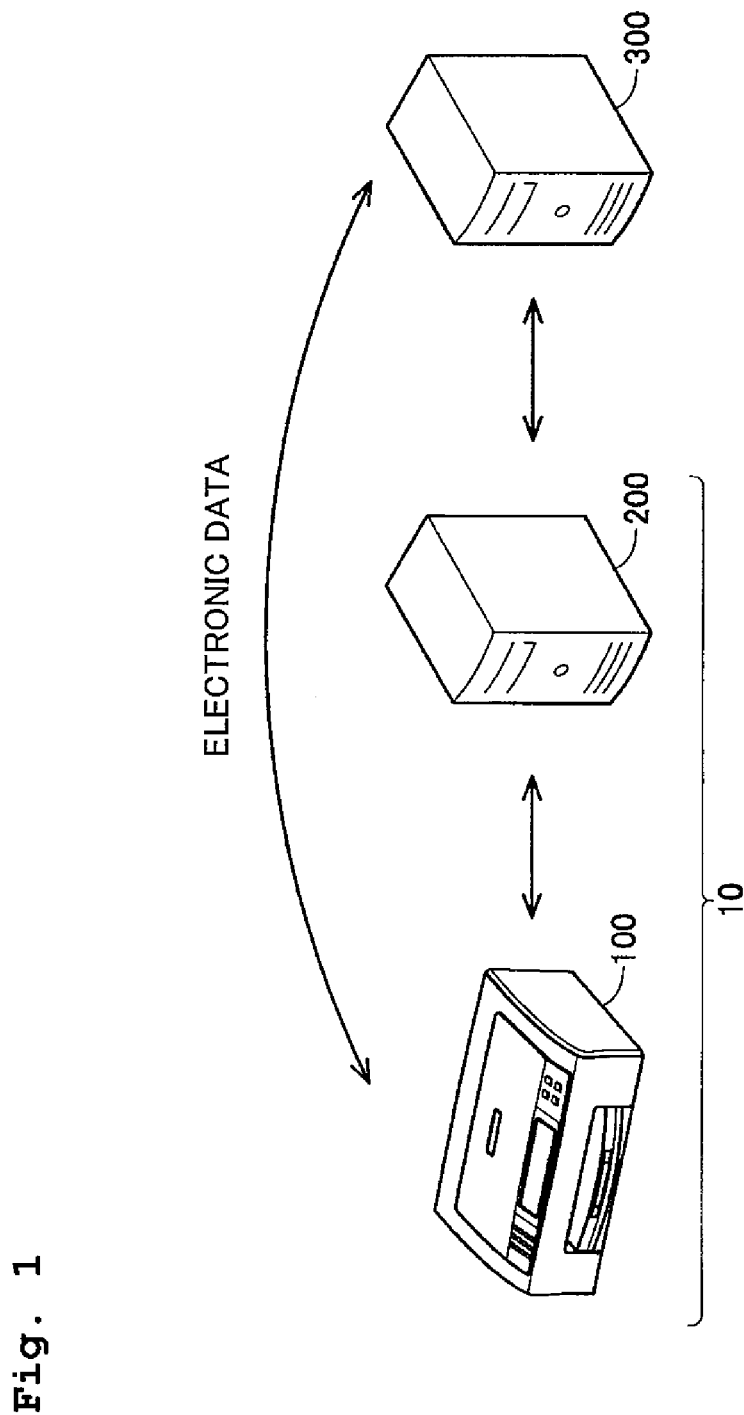
FIG. 1 is a diagram showing an outline of a service collaboration system according to an embodiment of the present invention.

An outline of a service collaboration system 10 will be described below by referring to FIG. 1. The service collaboration system 10 includes a multifunction device 100 and an intermediary apparatus 200. The service collaboration system 10 is capable of uploading electronic data to an electronic-data storage service which is provided by a service provider, and downloading electronic data from the electronic-data storage service.

The electronic-data storage service is provided by a service providing device 300 which has been installed on the network by each service provider. Or, the electronic-data storage service is provided by a group of devices on the Internet, including at least the service providing device 300. The electronic-data storage service communicate with a terminal, which is connected to the Internet and receives a service, by using Hyper Text Transfer Protocol (hereinafter, referred to as "HTTP") or Hyper Text Transfer Protocol over Secure Socket Layer (hereinafter, referred to as "HTTPS"), and stores electronic data which has been uploaded by the terminal which receives the service. The service providing device 300 may have a function as a known Web server. The service providing device 300 may have a function as a storage server which receives electronic data from a communication server which carries out communication by a terminal other than the service and the HTTP or the HTTPS, and stores the electronic data received. The service providing device 300 may be a large-sized computer or may be a personal computer.

It is possible to add tag data to electronic data which has been stored in the electronic-data storage service. The tag data is information which can be added to the electronic data in the electronic-data storage service. Tag data "dog" added to photo data of a dog and document data which contains an observation diary of the dog can be cited as an example of tag data. Tag data "sports festival 03092012" added to each of photo data of a dog photographed in a sports festival on Sep. 3, 2012 and photo data of a child photographed in the sports festival on Sep. 3, 2012 can be cited as another example of tag data. Here, "03092012" of the tag data "sports festival 03092012" means a date of Sep. 3, 2012. In other words, the tag data "dog" and the tag data "sports festival 03092012" are added to the photo data of the dog photographed in the sports festival on Sep. 3, 2012 from among photo data of the dog. When a keyword "dog" is specified, it is possible to retrieve photo data of the child and photo data of the dog photographed in the sports festival on Sep. 3, 2012, from among the photo data of the dog. In other words, the tag data which has been added to the electronic data is to be used as a keyword for retrieving the electronic data.

An example of data which is to be added to electronic data is shown in FIG. 14. It is possible to add data such as a folder name 601, a file name 602, an extension 603, and tag data 604 to electronic data. The folder name 601 is information indicating a location of storage of the electronic data. Therefore, it is not possible to add a plurality of folder names 601 to one electronic data. Moreover, the folder name 601 is determined uniquely at a point of time when the electronic data is stored. The file name 602 is information which identifies each of the electronic data. Therefore, it is not possible to add the same file name 602 to a plurality of electronic data which has been stored in the same folder. Moreover, it is not possible to add a plurality of file names 602 to one electronic data. The extension 603 is information which indicates a format of electronic data. Therefore, it is not possible to add a plurality of extensions to one electronic data. Moreover, the extension 603 is determined uniquely according to a format of the electronic data at a point of time at which the electronic data has been created. The tag data 604 is data which can be added to the electronic data separately from data such as the folder name 601, the file name 602, and the extension 603. A user of the electronic-data storage service can determine tag data for using as a keyword irrespective of a file name, a format, and a storage location of electronic data. The tag data is data having characteristics different from characteristics of other data which can be added to the electronic data. In other words, one tag data can be added to a plurality of electronic data. Moreover, it is possible to add a plurality of tag data to one electronic data. In the example in FIG. 14, "dog" and "sports festival 03092012" are added as the plurality of tag data 604 to electronic data having the file name 602 "dogAB". Moreover, the tag data 604 of "dog" has been added to the plurality of electronic data having the file names 602 of "dog1234", "dog_diary05", and "dogAB".

Figure 15:
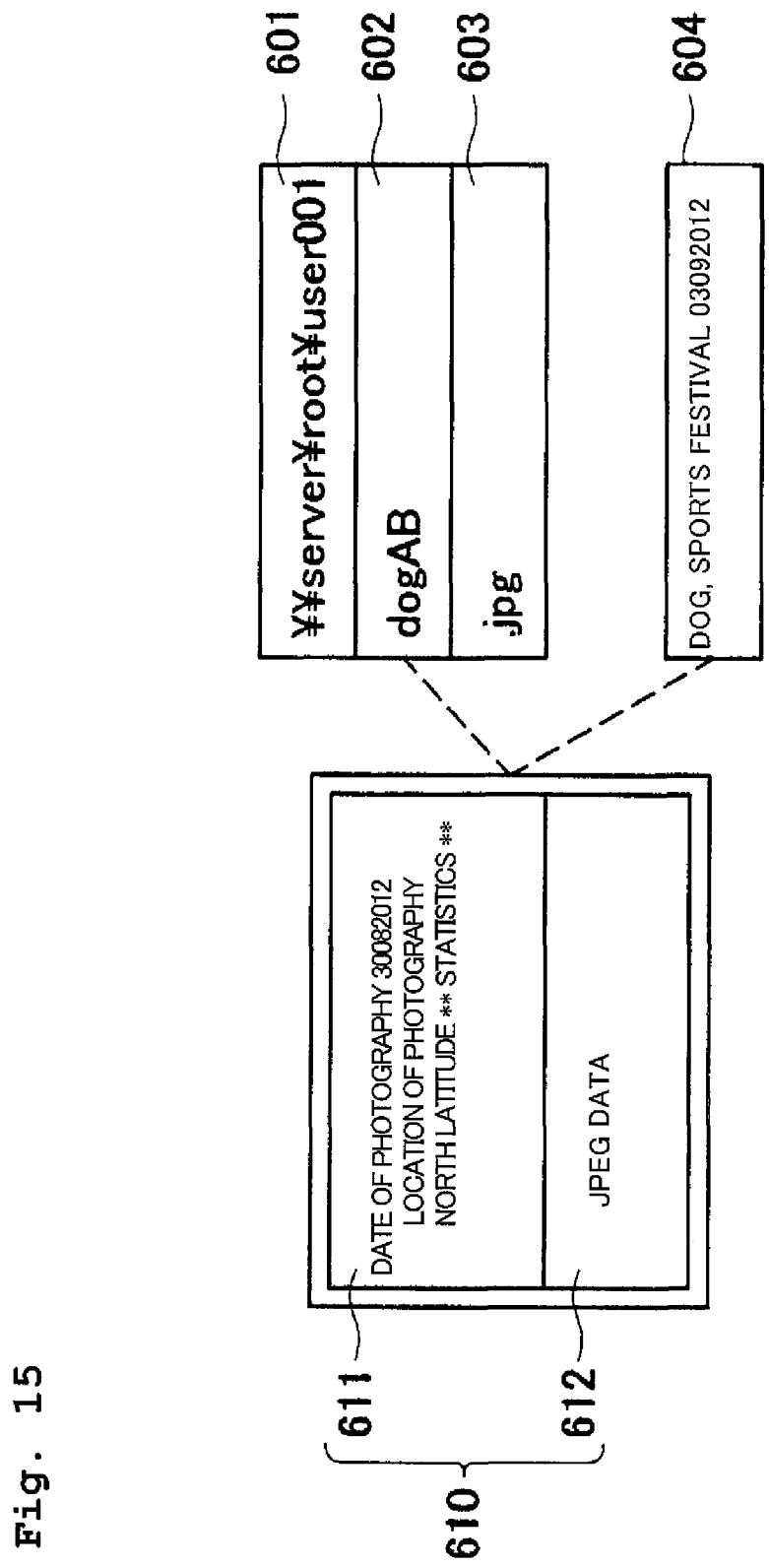
FIG. 15 is a diagram showing an example of a structure of the electronic data.

In FIG. 15, an example of a configuration of electronic data is shown. The folder name 601 of electronic data 610 shown in FIG. 15 is "¥¥server¥root¥user01", the file name 602 of the electronic data 610 is "dogAB", and the extension 603 of the electronic data 610 is ".jpg". The electronic data 610 includes auxiliary data 611 and a body portion 612. The auxiliary data 611 is metadata related to photography conditions such as a date of photography and a location of photography. Exif (abbreviation for Exchangeable image file format) can be cited as an example of a standard of the auxiliary data. The body portion 612 is an entity portion of JPEG (abbreviation for Joint Photographic Experts Group) data. It is possible to add the tag data 604 to the electronic data 610 irrespective of the presence or absence and content of the auxiliary data. For example, in the example in FIG. 15, even in a case in which the date of photography stored in the auxiliary data is Aug. 30, 2012, it is possible to add the tag data 604 which indicates a date of Sep. 3, 2012. As a matter of course, even in a case in which the date of photography which has been stored in the auxiliary data 611 is Sep. 3, 2012, it is possible to add the tag data 604 which indicates the date as Sep. 3, 2012. Moreover, the content of the auxiliary data 611 may be wide-ranging. For instance, in a case in which the body portion 612 is document data, the content of the auxiliary data 611 may be a writer, a page layout, or the number of pages.

A small-size digital multifunction device can be cited as an example of the multifunction device 100. The multifunction device 100 has functions such as a print function, a scanner function, a facsimile function, a copy function, and a function of writing in and reading out from an external storage medium. A user of the multifunction device 100 is capable of uploading electronic data of an image read by the scanner function of the multifunction device 100 to an electronic-data storage service. Moreover, the user of the multifunction device 100 is capable of printing electronic data which has been downloaded from the electronic-data storage service by the print function of the multifunction device 100.

The multifunction device 100 uploads and downloads electronic data in collaboration with the intermediary apparatus 200. The multifunction device 100 acquires an upload-destination URL (abbreviation for Uniform Resource Locator) which is a URL of an upload destination to which electronic data is to be uploaded in the electronic-data storage service, and a URL of the electronic data which is to be downloaded from the electronic-data storage service from the electronic-data storage service via the intermediary apparatus 200. However, transceiving of binary data of electronic data having a large amount of data is carried out directly between the multifunction device 100 and the electronic-data storage service, and not via the intermediary apparatus 200. Therefore, according to the service collaboration system 10, it is possible to suppress an amount of data which is transceived via the intermediary apparatus 200. Moreover, it is possible to suppress a load generated in the intermediary apparatus 200.

The intermediary apparatus 200 may be an apparatus having a known server function. The intermediary apparatus 200 may be provided uniquely by a manufacturer of the multifunction device 100. However, using a virtual machine in which a plurality of physical apparatuses function in coordination as one server, such as a known rental server can also be taken into consideration. In this case, an operation cost of the intermediate apparatus 200 changes according to the amount of data transceived via the intermediary apparatus 200 and a load of a processing in the intermediary apparatus 200. As it has been mentioned above, by reducing the amount of data transceived via the intermediary apparatus 200 and reducing the load generated in the intermediary apparatus 200, it is possible to suppress the operation cost of the intermediary apparatus 200 in a case of using the virtual machine. Moreover, even in a case in which the intermediary apparatus 200 is provided uniquely by the manufacturer, since the intermediary apparatus 200 does not necessitate a superior processing performance, it is possible to suppress equipment investment of the intermediary apparatus.

<Hardware Configuration of Service Collaboration System 10>

Figure 2A:
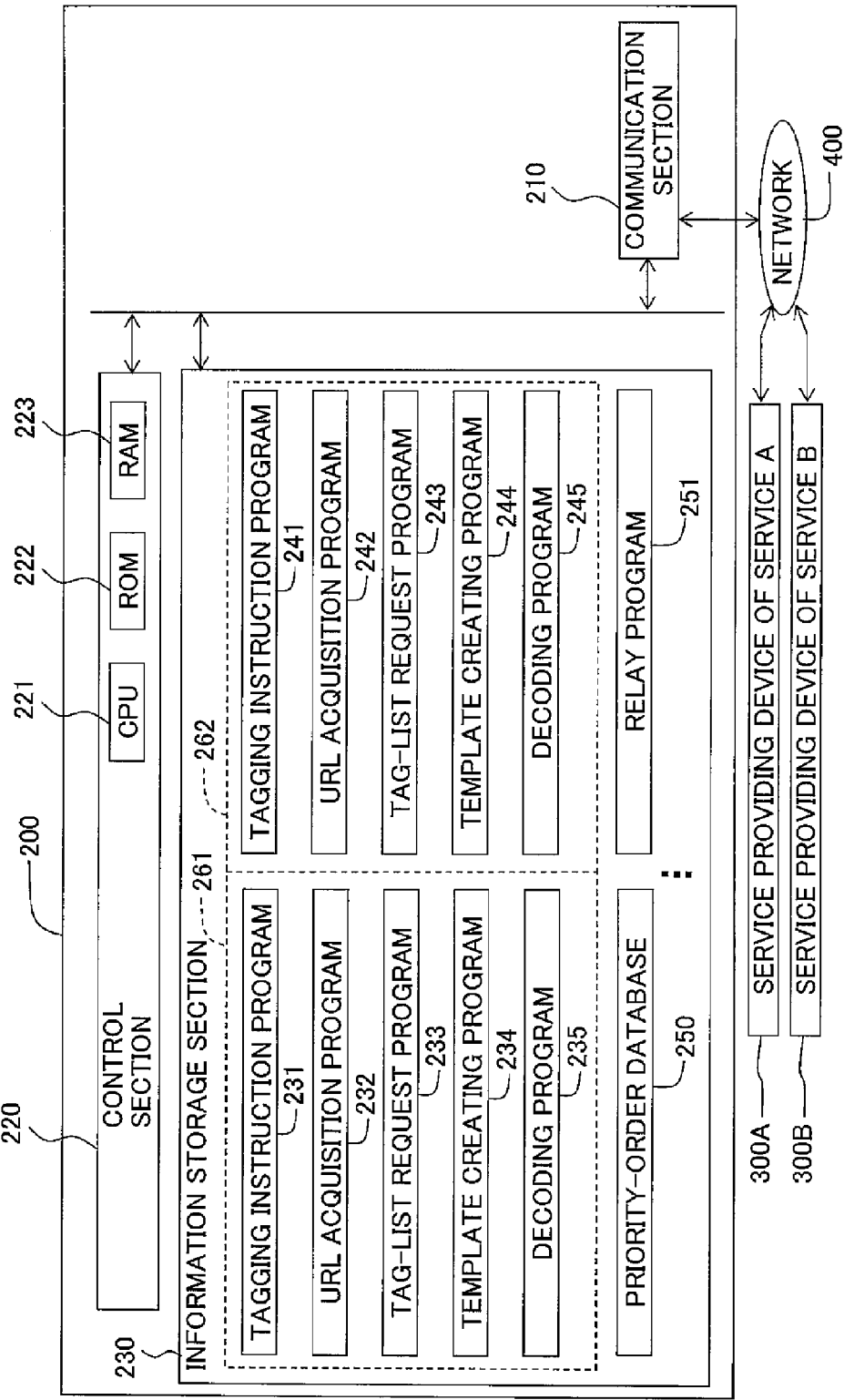
FIGS. 2A and 2B show a configuration of hardware in the service collaboration system.
Figure 2B:
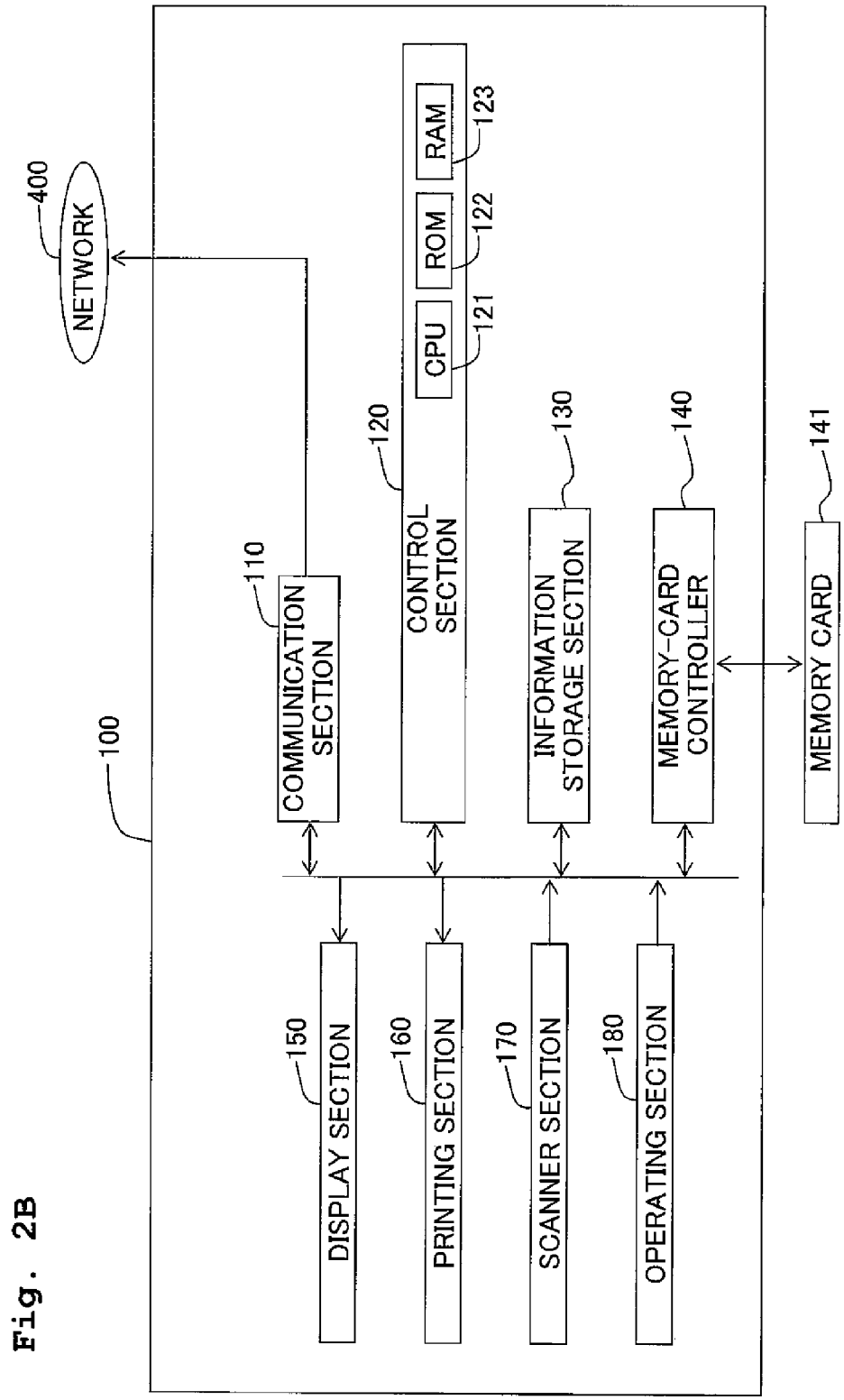
Figure 3A:
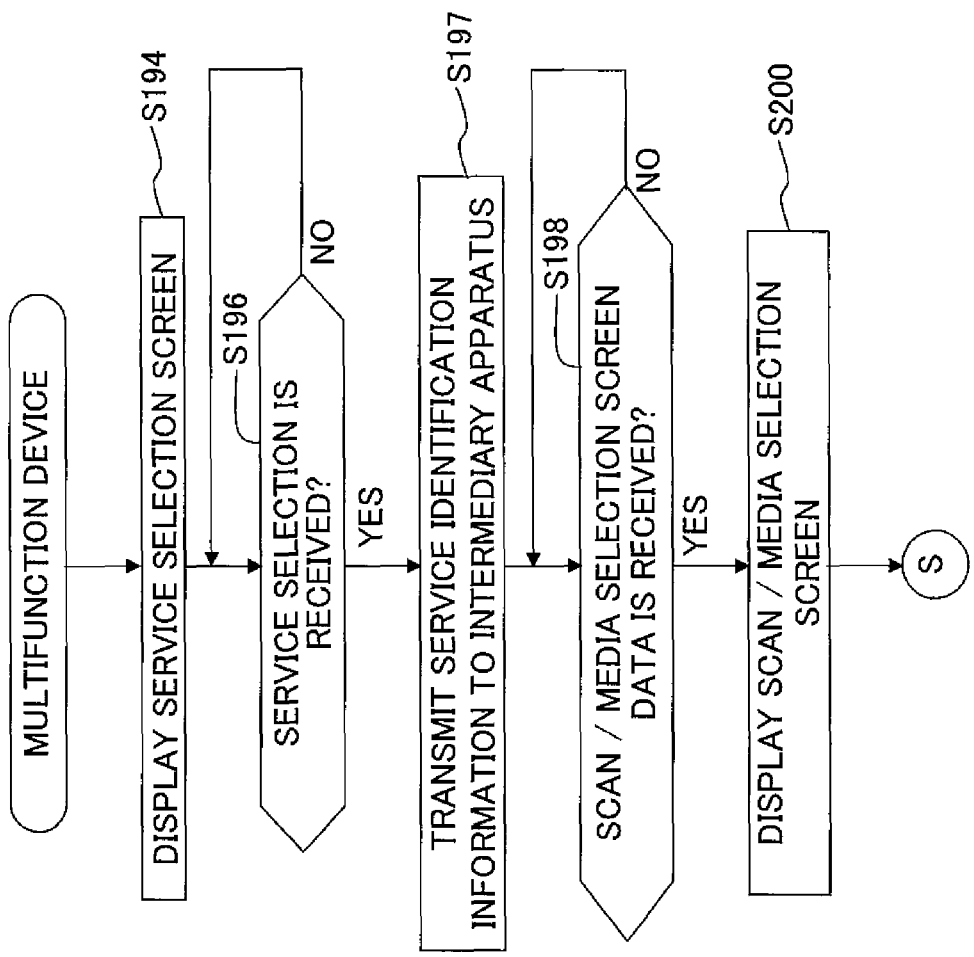
FIGS. 3A, 3B, 4A, 4B, 5A, and 5B show a flow diagram indicating an operation of a multifunction device.
Figure 3B:
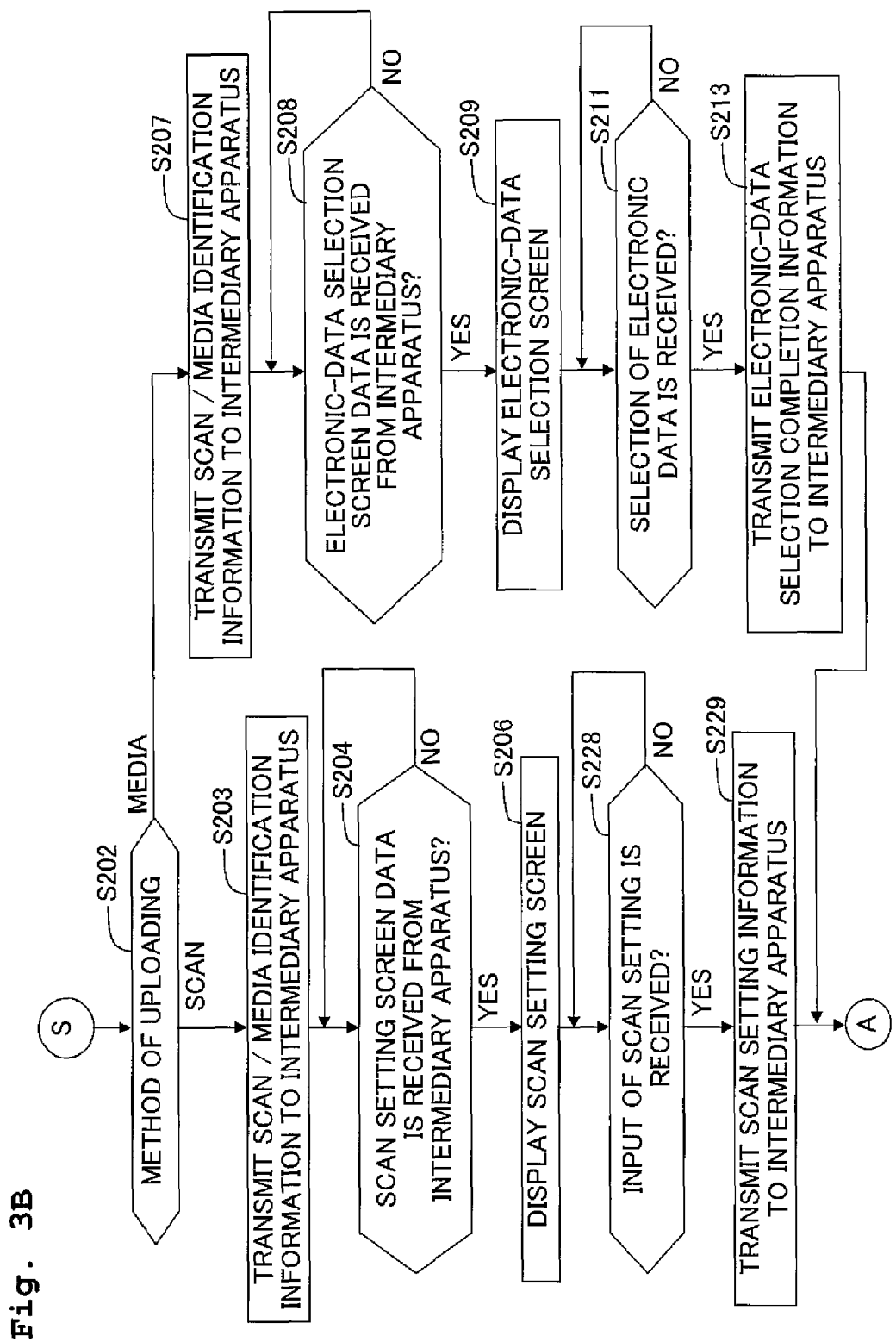
Figure 4A:
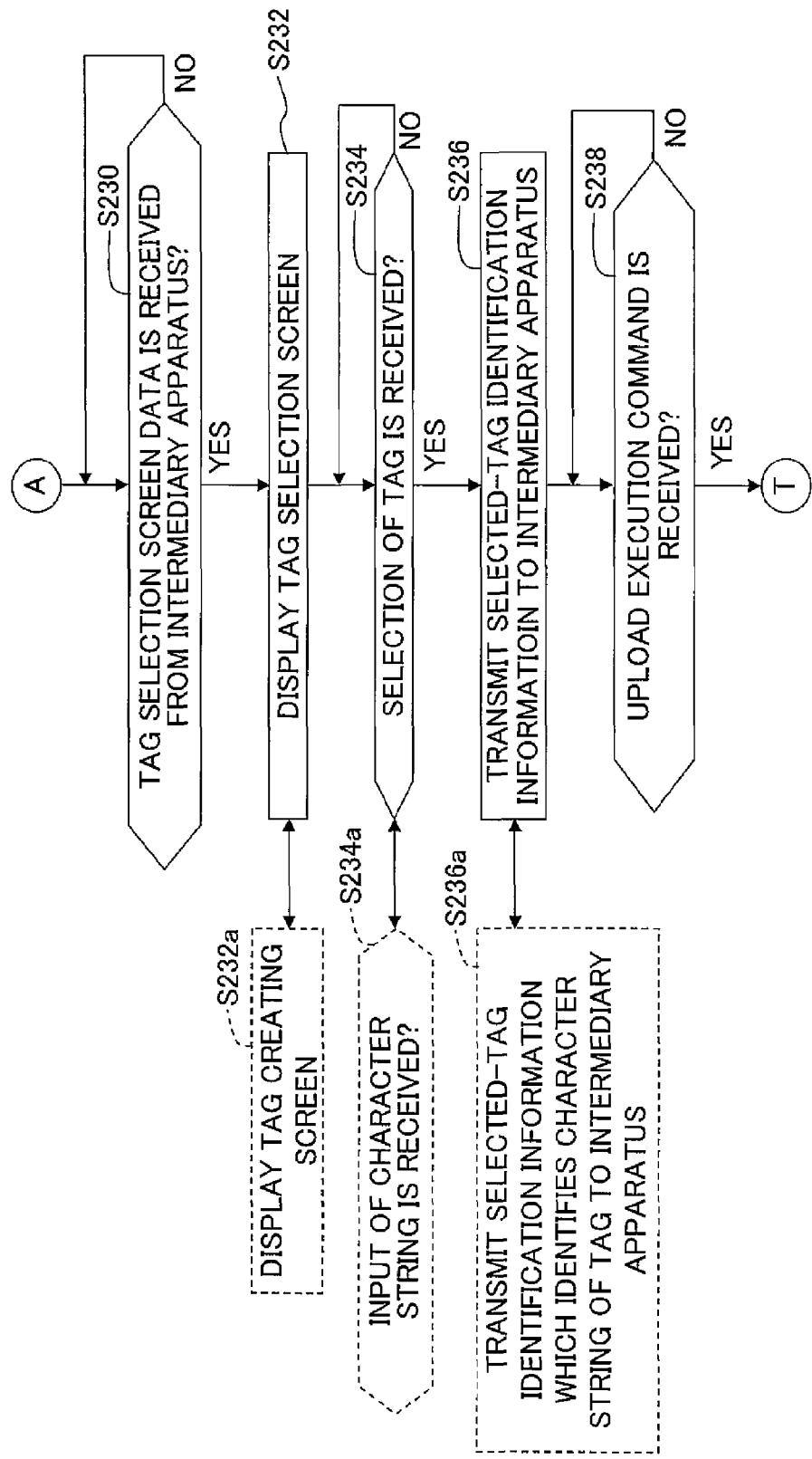
Figure 4B:
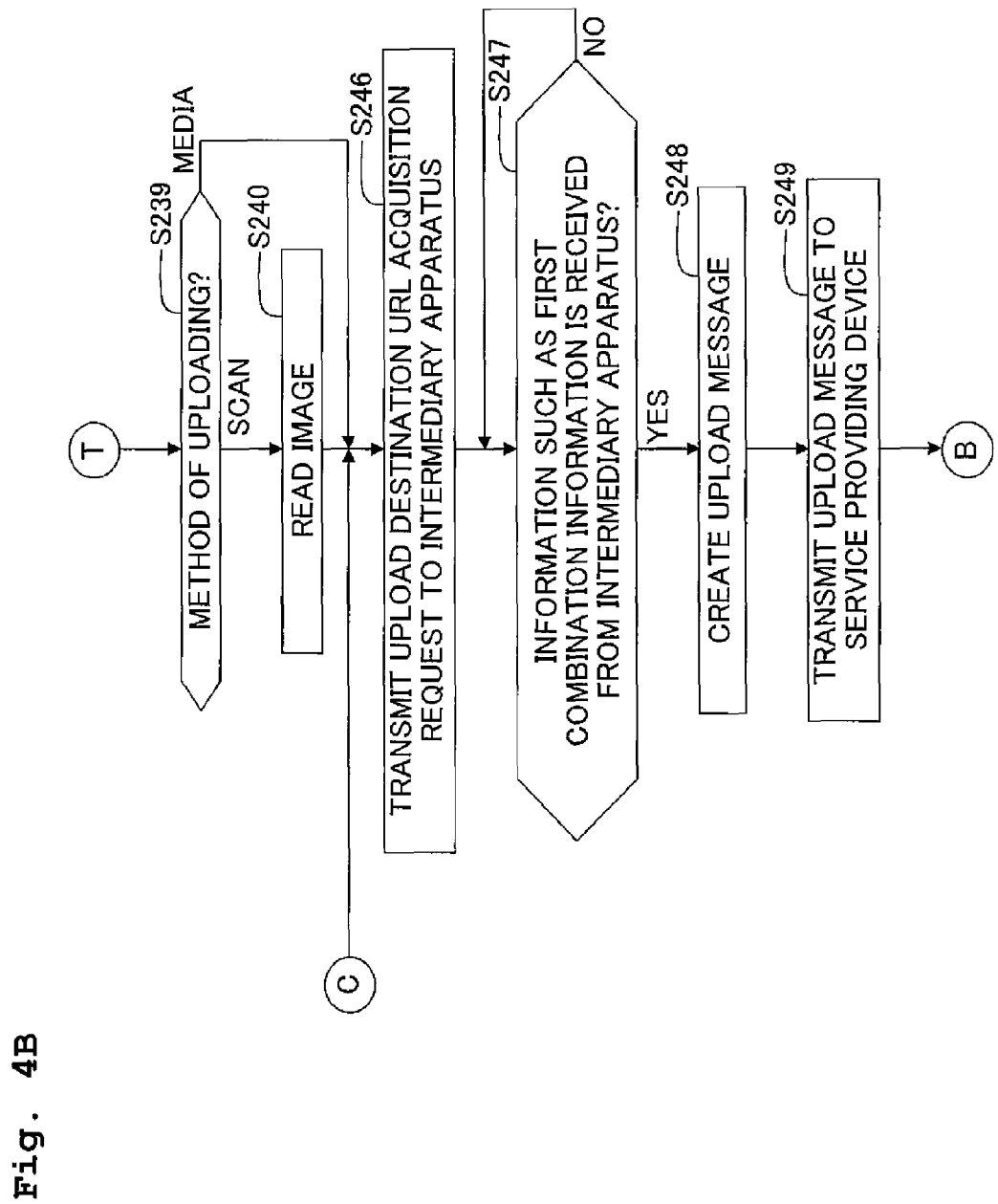
Figure 5A:
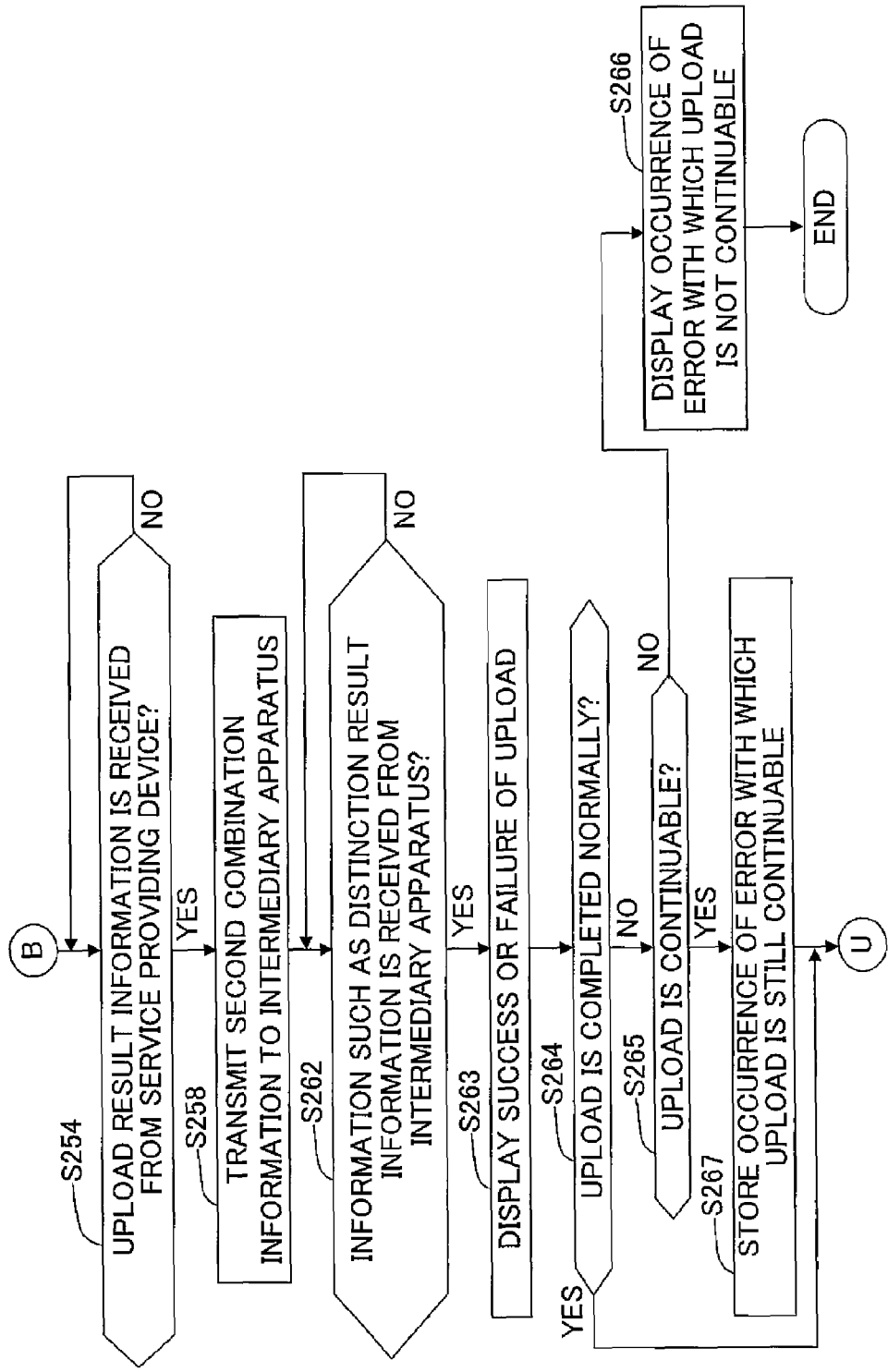
Figure 5B:
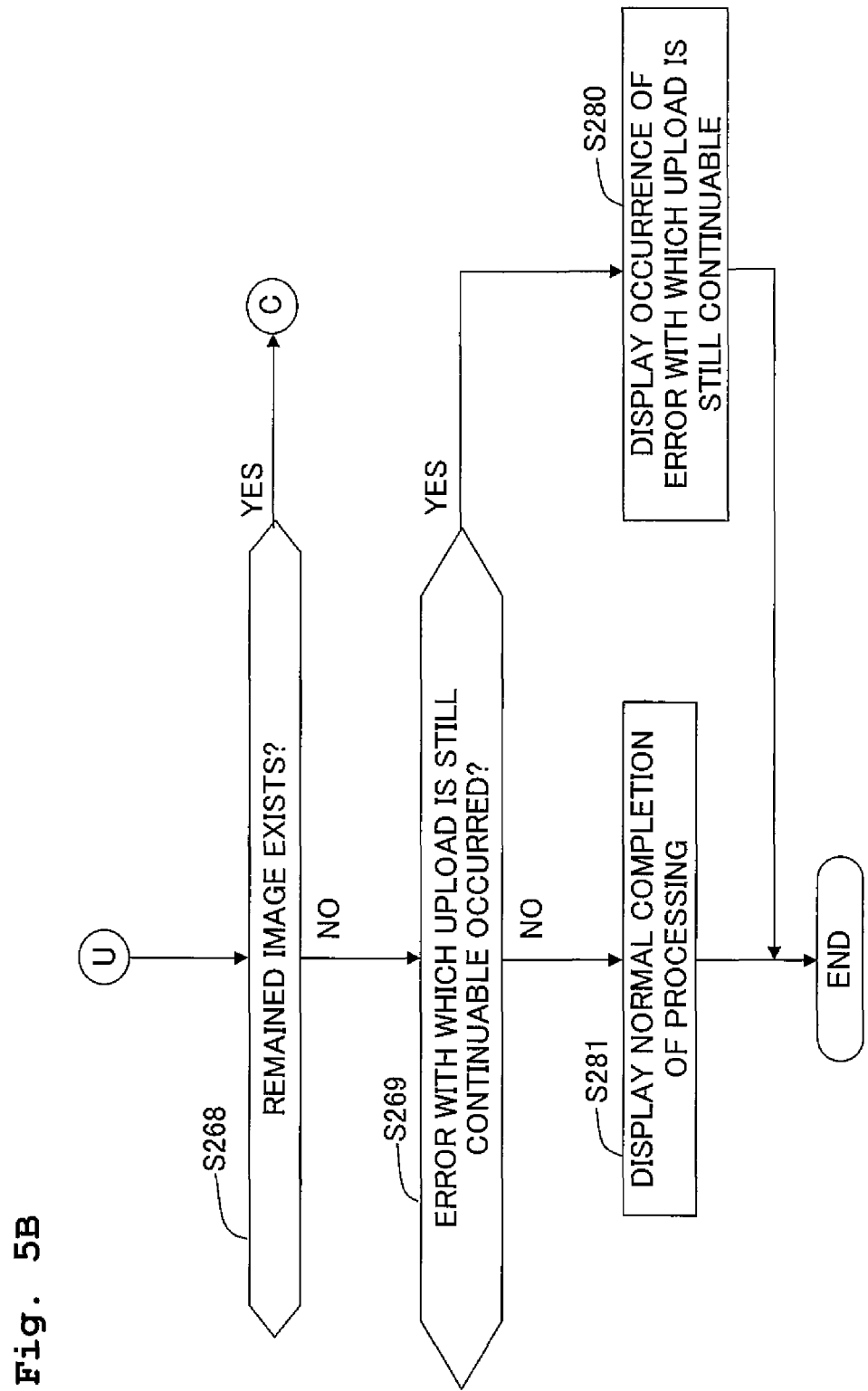
Figure 6A:
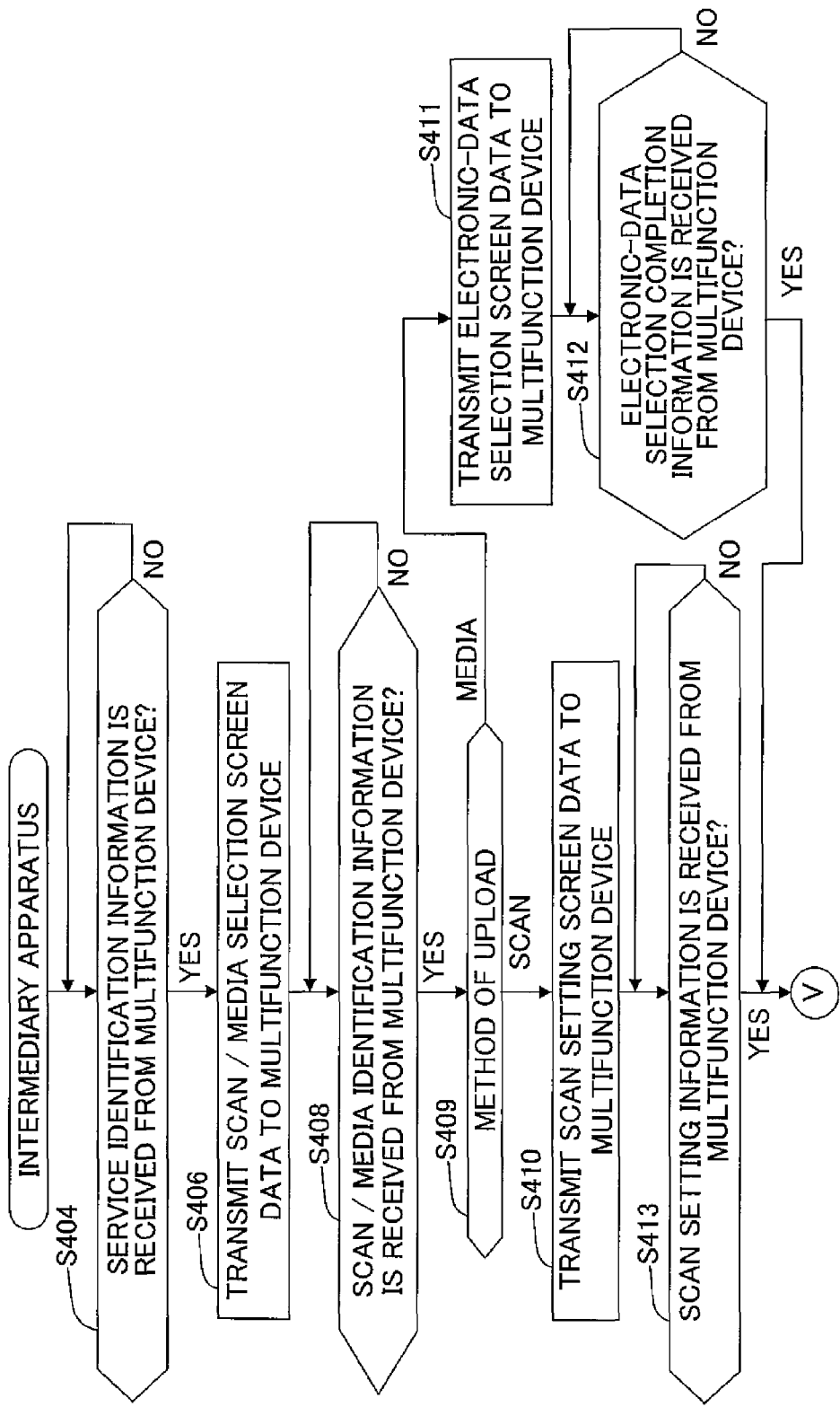
FIGS. 6A, 6B, 7A, 7B, 8A, and 8B show a flow diagram indicating an operation of an intermediary apparatus.
Figure 6B:
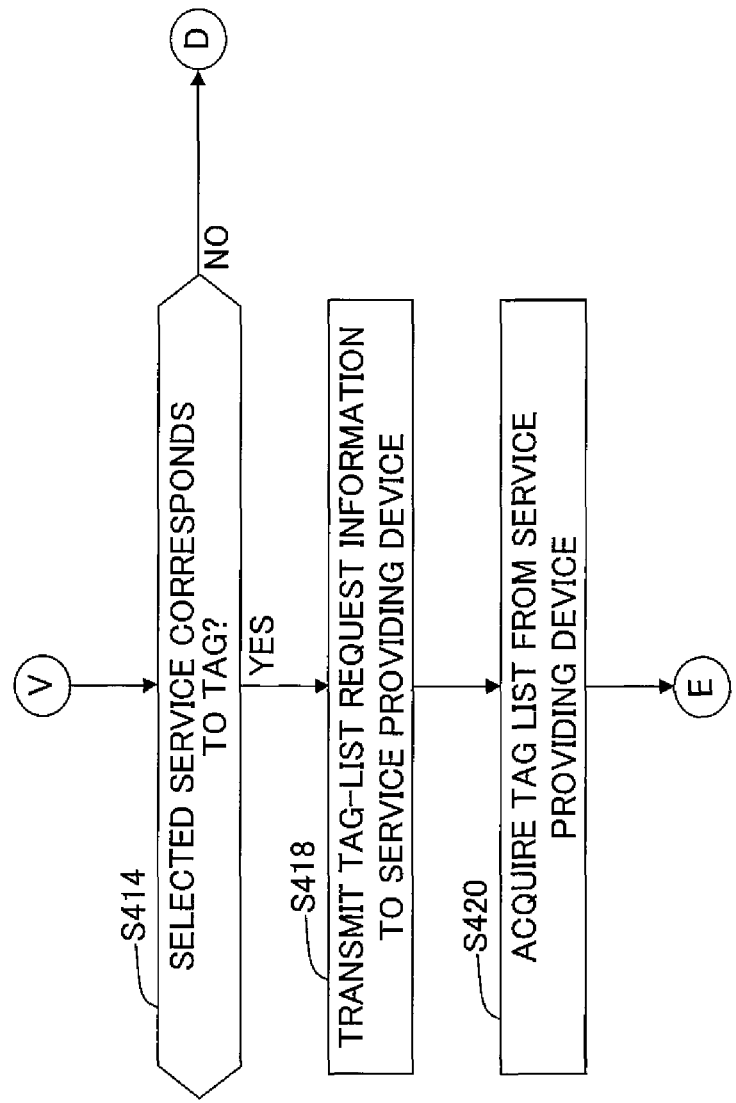

A hardware configuration of the service collaboration system 10 will be described below by referring to FIGS. 2A and 2B. In the following description, the service collaboration system 10 will be described as a system in which a service A and a service B which are two electronic-data storage services are collaborated. In the following description, the service providing device 300 of the service A is called as a service providing device 300A. Moreover, the service providing device 300 of the service B is called as a service providing device 300B. In a case in which it is not necessary in particular, to distinguish between the service providing device 300A and the service providing device 300B, the service providing device will be called as the service providing device 300. The multifunction device 100, the intermediary apparatus 200, the service providing device 300A, and the service providing device 300B are connected mutually via a network 400. A network such as the Internet network can be adopted as the network 400. Transceiving of data between the multifunction device 100, the intermediary apparatus 200, and the service providing device 300 is carried out according to HTTP/1.1.

A hardware configuration of the multifunction device 100 will be described below. The multifunction device 100 includes a communication section 110, a control section 120, an information storage section 130, a memory card controller 140, a display section 150, a printing section 160, a scanner section 170, and an operating section 180. The communication section 110 is equipment for carrying out communication with other device connected to the network. A known network card can be adopted as the communication section 110. The control section 120 includes a CPU (abbreviation for central processing unit) 121, and a ROM (abbreviation for read only memory) 122 and a RAM (abbreviation for random access memory) 123 which are connected to the CPU 121. The CPU 121 controls an operation of the multifunction device 100 according to a computer program which has been stored in the ROM 122. The ROM 122 is an example of a computer-readable storage medium. The "computer-readable storage medium" means a non-transitory medium such as ROM, RAM, flash memory, hard disk, and the like. An electric signal, which transmits a program downloaded from a server etc on the internet, is not included in the non-transitory medium. The RAM 123 is a storage device which stores various data temporarily.

The information storage section 130 is a non-volatile storage device such as an NAND-type flash memory. The information storage unit 130 stores various setting information such as user-specific information, for specifying the user of the multifunction device 100. In a case in which a plurality of users is using one multifunction device 100 jointly; an arrangement may be made such that, user-specific information of a user who has logged in is stored in the information storage section 130. The memory card controller 140 carries out control of a memory in a memory card 141 which has been installed in the multifunction device 100. Concretely, the memory card controller 140 carries out writing of data in the memory card 141, deletion of data which has been stored in the memory card 141, and reading of data which has been stored in the memory card 141. Electronic data of a predetermined format has been stored in the memory card 141.

The display section 150 is a display device which includes a display such as a known LCD (abbreviation for liquid crystal display). The display section 150 displays predetermined information such as a menu-item selection screen which will be described later, according to an instruction from the control section 120. The printing section 160 is a device which carries out printing of an image according to an instruction from the control section 120. The scanner section 170 is equipment which reads an image recorded on a paper which has been set by the user. The scanner section 170 reads an image according to an instruction from the control section 120. The operating section 180 includes a plurality of operating buttons to be operated by the user, and is a device which transmits a signal corresponding to a pressing operation by the user. The user can input a desired instruction by operating the operating section 180.

A hardware configuration of the intermediary apparatus 200 will be described below. In the embodiment, the intermediary apparatus 200 will be described as a server which exists physically, and the intermediary apparatus 200 as mentioned above, may be a virtual machine in which a plurality of physical apparatuses function in coordination as one server.

The intermediary apparatus 200 includes a communication section 210, a control section 220, and an information storage section 230. The communication section 210 is equipment for carrying out communication with other device connected to the network. A known network card can be adopted as the communication section 210. The control section 220 includes a CPU 221, and a ROM 222 and a RAM 223 which are connected to the CPU 221. The CPU 221 controls an operation of the intermediary apparatus 200 according to a computer program which has been stored in the ROM 222 and the information storage section 230. The RAM 223 is a storage device which stores various data temporarily.

The information storage section 230 is a non-volatile storage device such as a hard-disc drive. The information storage section 230 has a computer-program group 261 which includes computer programs for the service A, and a computer-program group 262 which includes computer programs for the service B. A module of a plurality of softwares of a tagging instruction computer program 231, a URL acquisition computer program 232, a tag-list request computer program, a template creating computer program 234, and a decoding computer program 235 is included in the computer-program group 261. The tagging instruction computer program 231 is a computer program for transmitting tagging instruction information which will be described later, to the service providing device 300A by using an API released for the service A. The URL acquisition computer program 232 is a computer program for transmitting upload-information request information which will be described later, to the service providing device 300A by using an API released for the service A. The upload-information request information is a coined word created in the embodiment, which indicates information which makes a request for information necessary for uploading. The tag-list request computer program 233 is a computer program for transmitting tag-list request information which will be described later, to the service providing device 300A by using an API released for the service A. The template creating computer program 234 is a computer program which creates a template of an upload message which is a message at the time of uploading electronic data to the service A. The decoding computer program 235 is a computer program for decoding a response message from the service providing device 300A.

Moreover, a module of a plurality of softwares of a tagging instruction computer program 241, a URL acquisition computer program 242, a tag-list request computer program 243, a template creating computer program 244, and a decoding computer program 245 is included in the computer-program group 262 of the information storage section 230. The tagging instruction computer program 241 is a computer program for transmitting tagging instruction information to the service providing device 300B by using an API released for the service B. The URL acquisition computer program 242 is a computer program for transmitting upload-information request information to the service providing device 300B by using an API released for the service B. The tag-list request computer program 243 is a computer program for transmitting tag-list information to the service providing device 300B by using an API released for the service B. The template creating computer program 244 is a computer program which creates a template of an upload message which is a message at the time of uploading electronic data to the service B. The decoding computer program 245 is a computer program for decoding a response message from the service providing device 300B. The information storage section 230 is an example of a computer-readable storage medium.

Figure 7A:
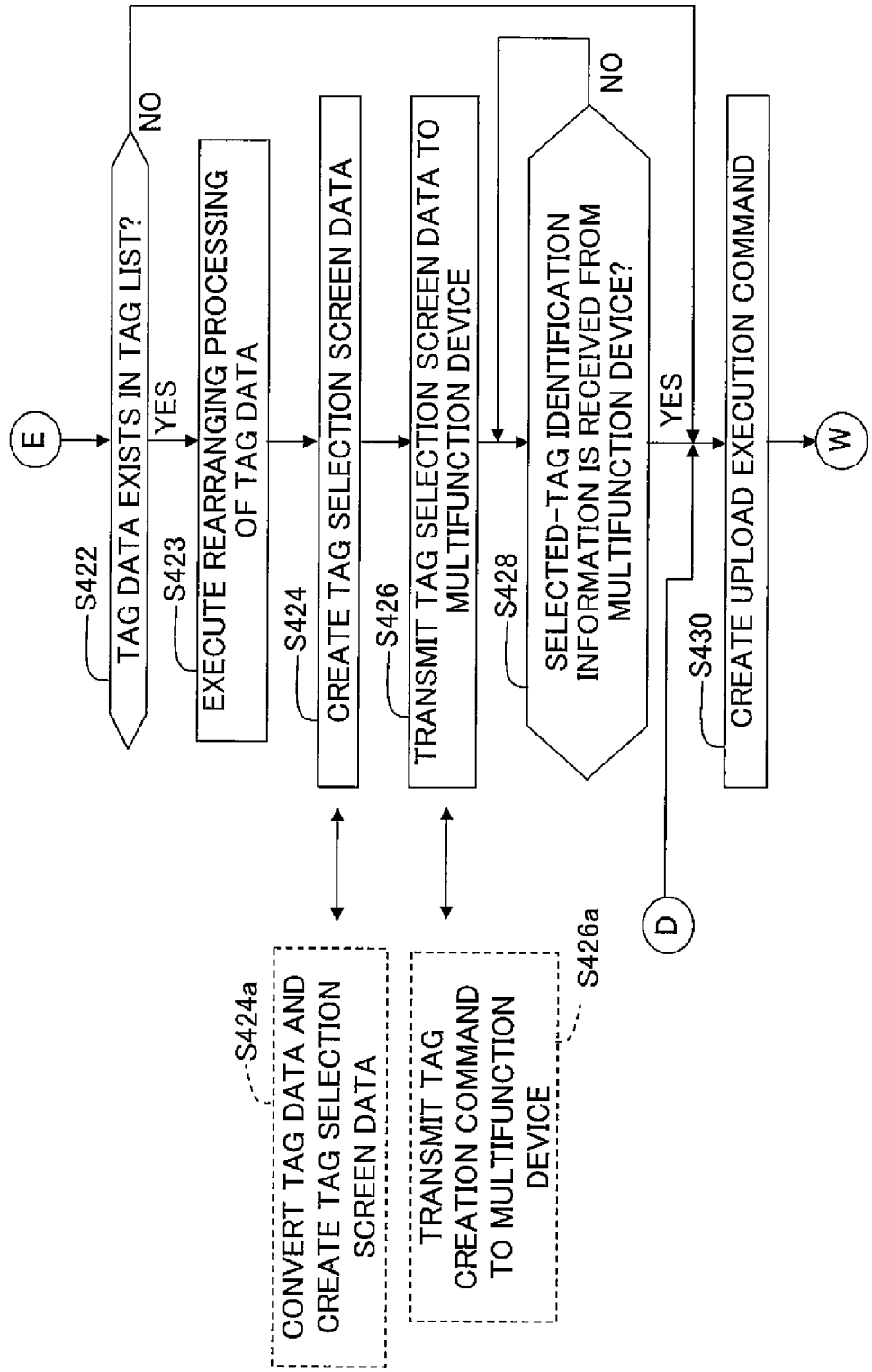
Figure 7B:
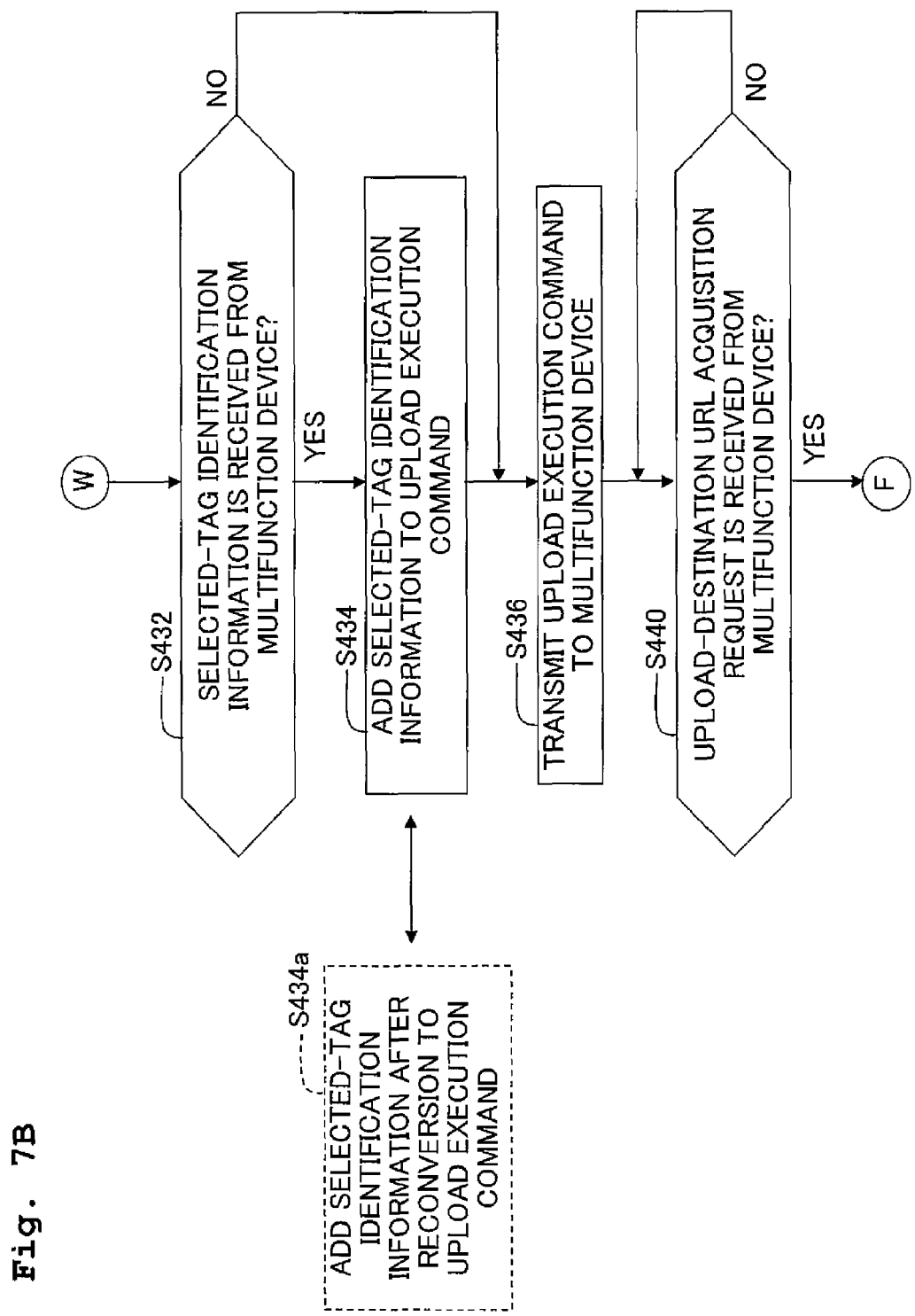
Figure 8A:
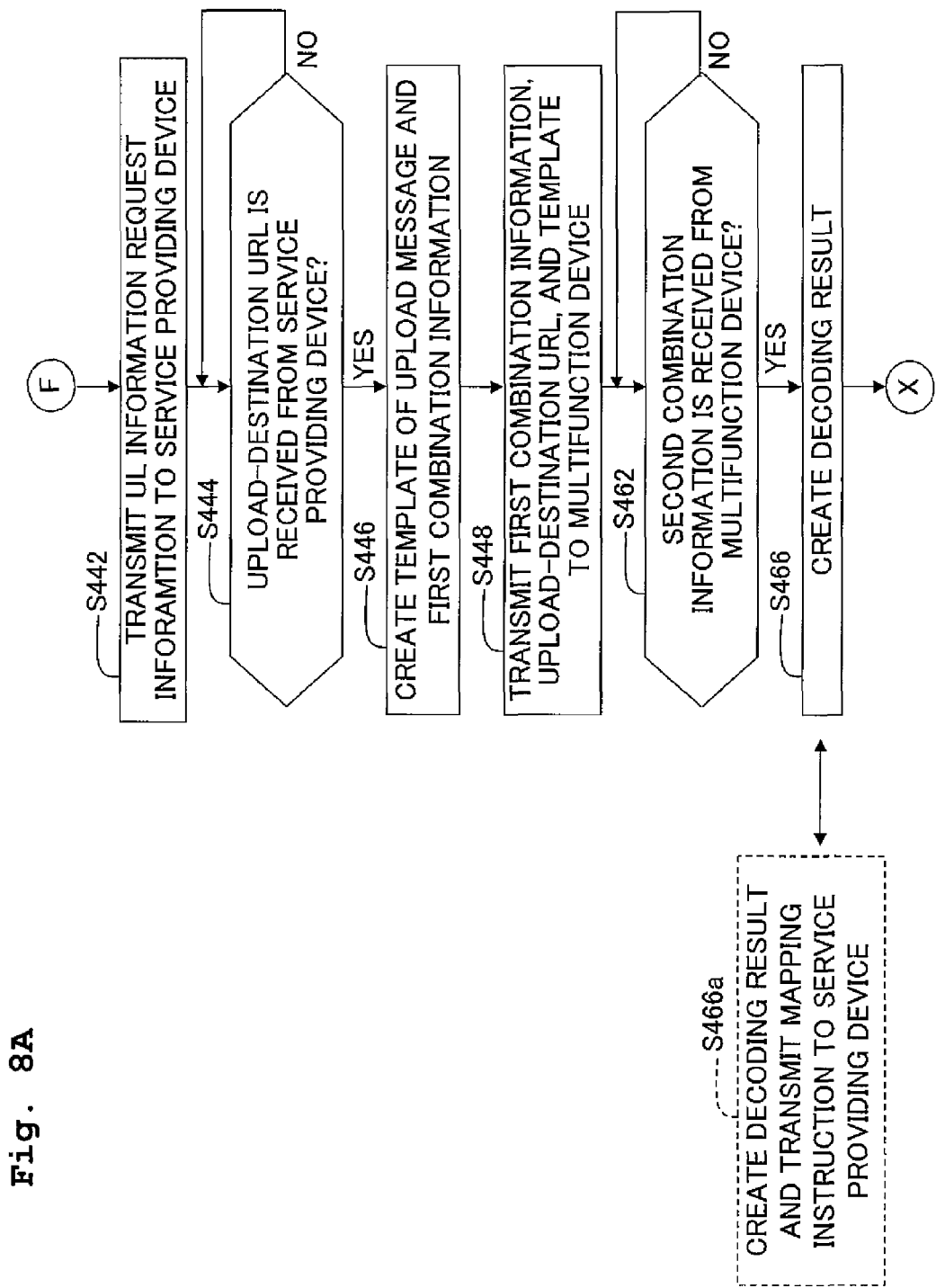
Figure 8B:
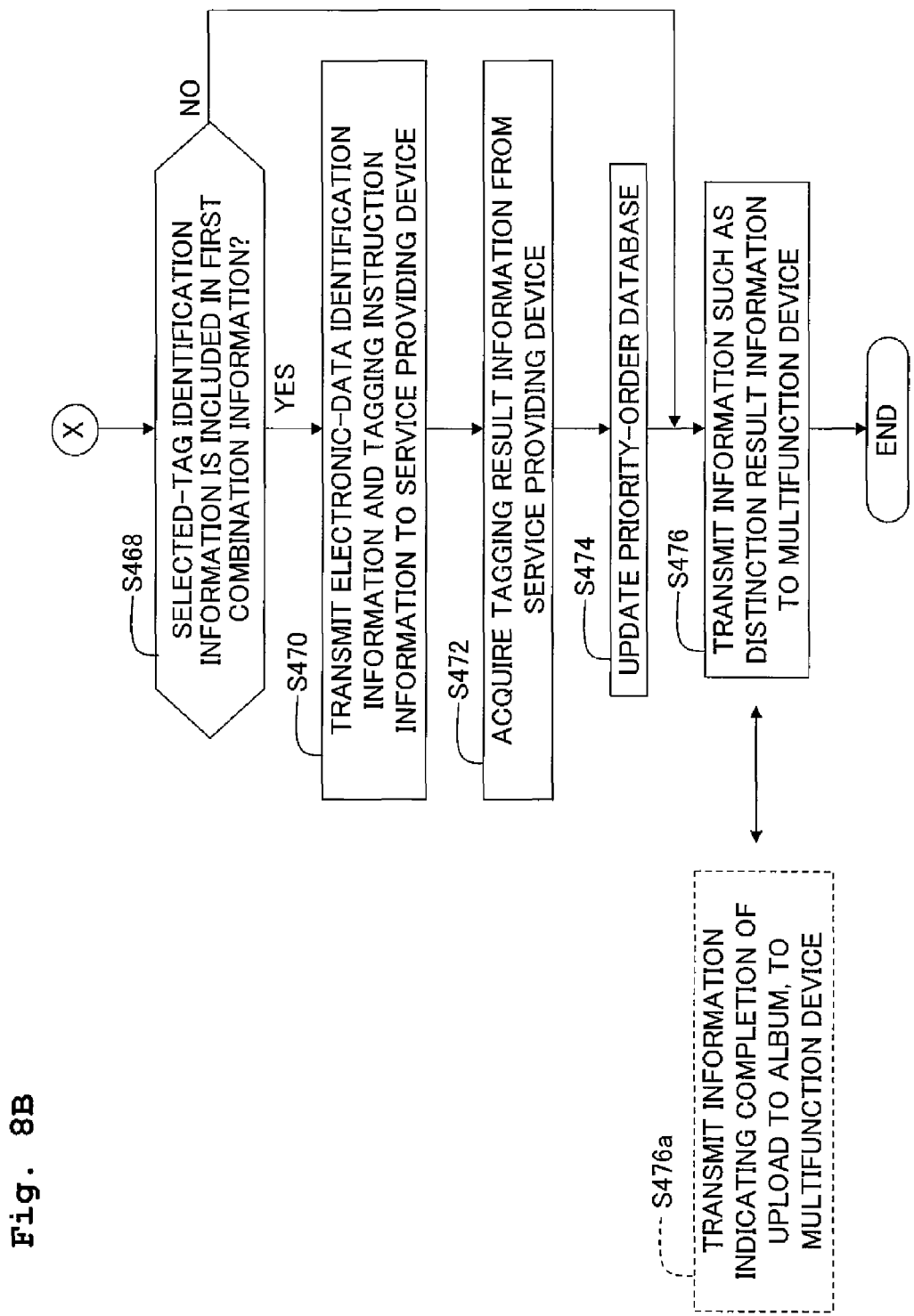
Figure 9A:
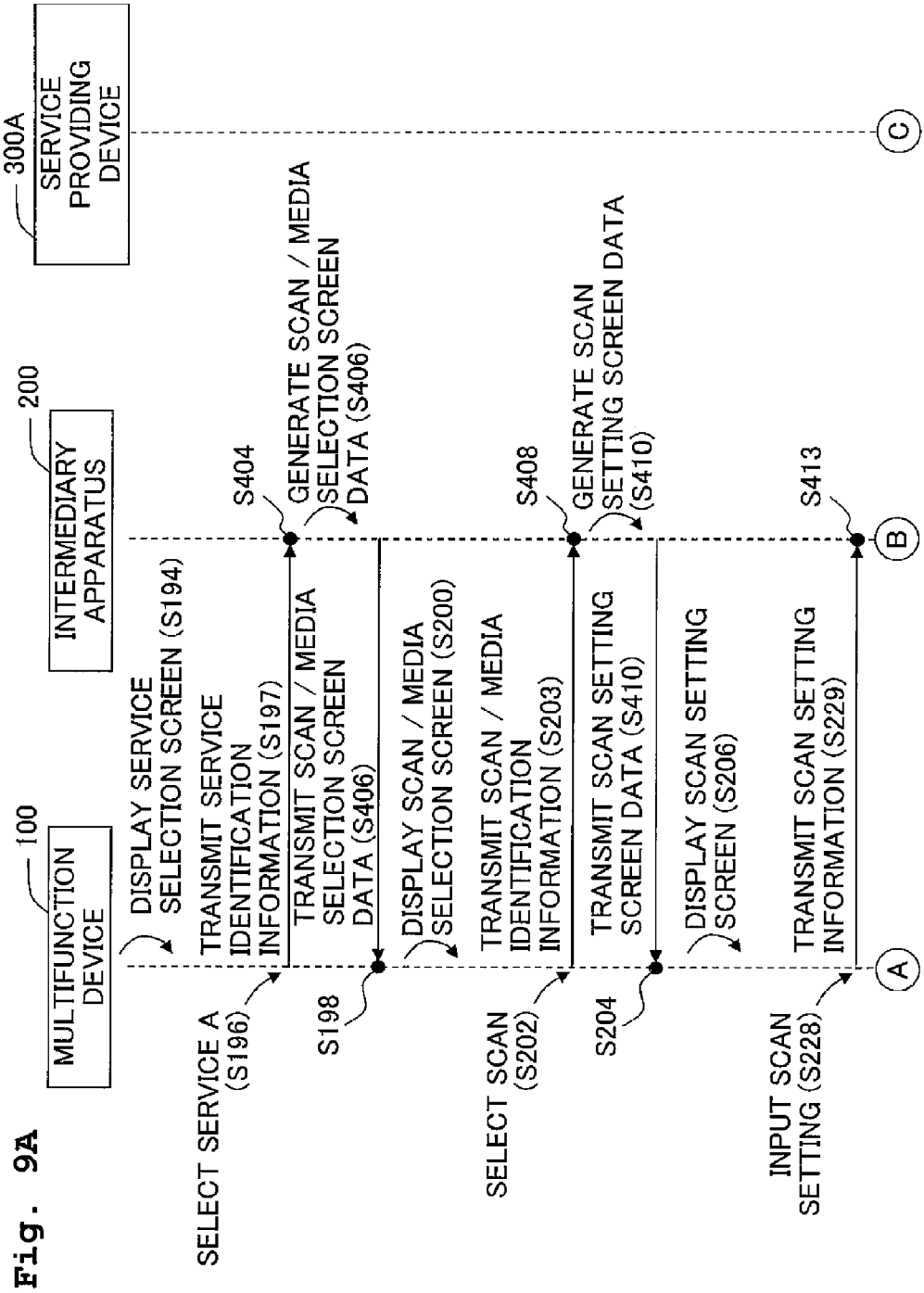
Figure 9B:
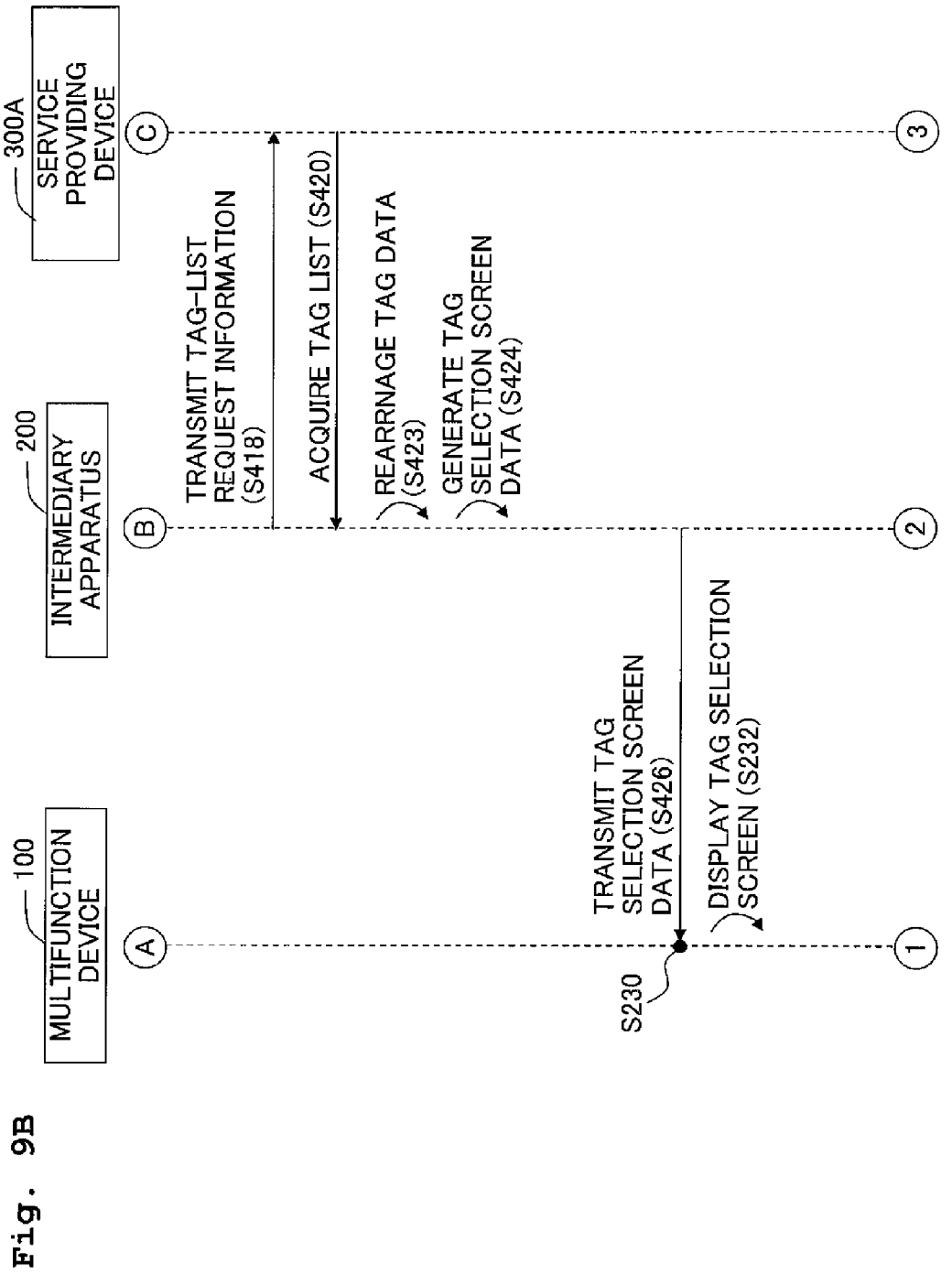
Figure 10A:
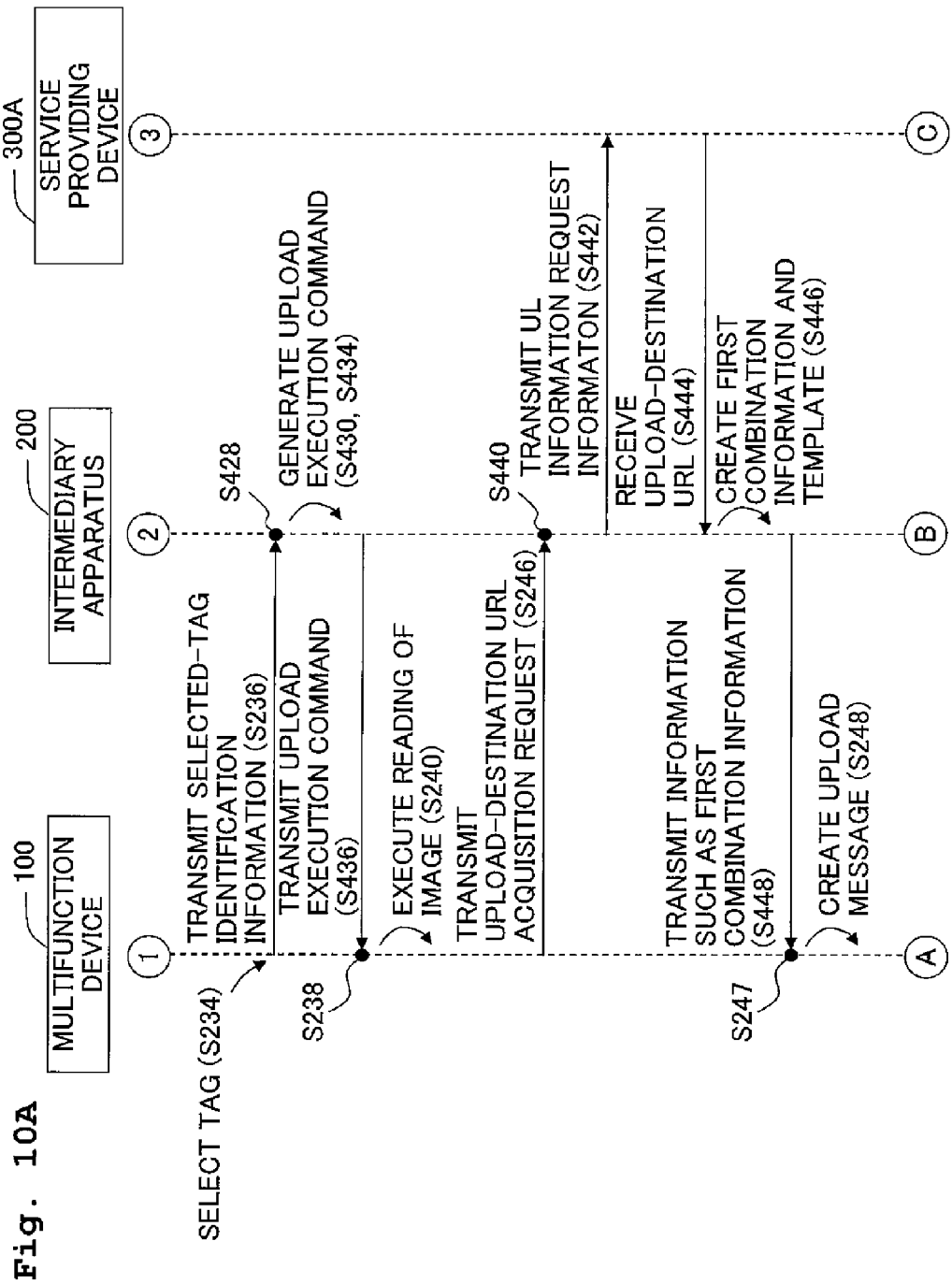

Moreover, the information storage section 230 stores a priority-order database 250. The priority-order database 250 is a database which stores a priority order of the tag data. An order of a frequency of usage and an order of a date and time of last use can be cited as examples of the priority order. The priority-order database 250 is to be used in a rearranging processing of the tag data which will be described later (for example: FIG. 7A, step S423).

The information storage section 230 stores a relay computer program 251. The relay computer program 251 is a computer program for carrying out a relay of communication with the multifunction device 100 and the service providing device 300 in collaboration with the plurality of modules mentioned above.

It is possible for the user of the multifunction device 100 to specify a desired service from among the plurality of electronic-data storage services. Moreover, the user of the multifunction device 100 can upload desired electronic data to the service specified. Also, the user of the multifunction device 100 can select either to upload electronic data of an image read by the scanner section 170, or to upload existing electronic data which has been stored in the memory card 141.

<Operation of Multifunction Device 100>

An upload processing which is carried out in the multifunction device 100 will be described below by referring to a flow in diagrams FIG. 3A, FIG. 3B, FIG. 4A, FIG. 4B, FIG. 5A, and FIG. 5B. In the following description, an expression "the control section 120 receives information" means that the CPU 121 acquires information which the communication section 110 has received, from the communication section 110 via a buffer or the RAM 123. Moreover, an expression "the control section 120 transmits information" means that the CPU 121 outputs information to the buffer or the RAM 123, and transmits that information via the communication section 110. The upload processing may be started in accordance with an instruction for execution of the upload processing being input by the user. In the embodiment, as an example, a processing in a case in which the service A is selected as a destination for upload of electronic data, will be described.

Figure 11:
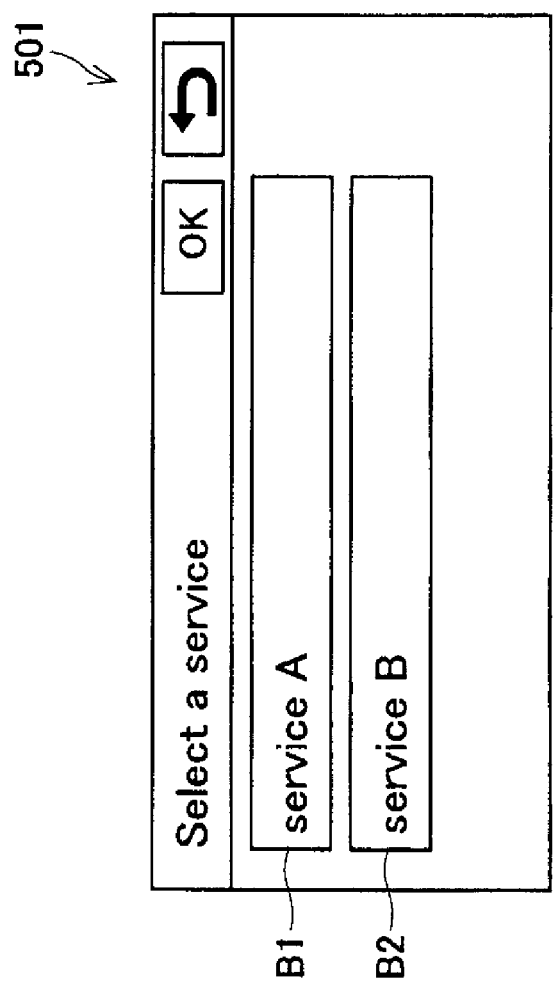
FIG. 11 is a diagram showing an example of a service selection screen in a display section.

As the upload processing is started, at step S194, the control section 120 displays service selection screen on the display section 150. In FIG. 11, a service selection screen 501 in the embodiment is shown. A button image B1 for selecting the service A and a button image B2 for selecting the service B are displayed on the service selection screen 501. Therefore, the user can select a desired service from the service A and the service B.

At step S196, the control section 120 makes a judgment of whether or not a selection of service by the user has been received. In a case in which the selection of service has not been received (NO at step S196), the process returns to step S196, and in a case in which the selection of service has been received (YES at step S196), the process advances to step S197. At step S197, the control section 120 transmits service identification information which is for identifying the service selected by the user, and also stores in the RAM 123 of the control section 120. The service identification information is information for identifying a service which has been selected from the plurality of services, by the user of the multifunction device 100. In the embodiment, since a case in which the service A has been selected by the user is described; the service identification information for identifying the service A is transmitted to the intermediary apparatus 200.

At step S198, the control section 120 makes a judgment of whether or not scan/media selection screen data has been received from the intermediary apparatus 200. The scan/media selection screen data is data for displaying a scan/media selection screen on the display section 150. The scan/media selection screen is a screen, for making the user select one of scan and media as an uploading method. In a case in which the scan/media selection screen data has not been received (NO at step S198), the process returns to step S198, and in a case in which the scan/media selection screen data has been received (YES at step S198), the process advances to step S200.

At step S200, the control section 120 displays the scan/media selection screen on the display section 150. Items "SCAN" and "MEDIA" are displayed on the scan/media selection screen as items to be selected for the uploading method. "SCAN" is an item which makes read an image printed on a paper by the scanner section 170, and makes upload electronic data of that screen to the service. Whereas, "MEDIA" is an item which selects a desired electronic data from the electronic data which has been stored in advance in the memory card 141, and makes upload the electronic data which has been selected, to the service.

At step S202, the control section 120 makes a judgment of as to which one of "SCAN" and "MEDIA" has been selected by the user as a method of uploading the electronic data. In a case in which "MEDIA" has been selected (MEDIA at step S202), the process advances to step S207. At step S207, the control section 120 transmits scan/media identification information which indicates that the uploading method selected by the user is "MEDIA", to the intermediary apparatus 200. At step S208, the control section 120 makes a judgment of whether or not electronic-data selection screen data has been received from the intermediary apparatus 200. The electronic-data selection screen data is data for displaying an electronic-data selection screen on the display section 150. The electronic-data display screen is a screen for making the user select desired electronic data from electronic data which has been stored in the memory card 141. In a case in which the electronic-data selection screen data has not been received (NO at step S208), the process returns to step S208, and in a case in which the electronic-data selection screen data has been receive (YES at step S208), the process advances to step S209. At step S209, the control section displays the electronic-data selection screen on the display section 150.

At step S211, the control section 120 makes a judgment of whether or not a selection of electronic data to be uploaded to the service A has been received via the operating section 180. When the selection of electronic data has not been received (NO at step S211), the process returns to step S211. When the selection of electronic data has been received (YES at step S211), the process advances to step S213. At step S213, the control section 120 transmits electronic-data selection completion information to the intermediary apparatus 200. The electronic-data selection completion information is information which indicates that the selection of the electronic data by the user has been completed.

Whereas, in a case in which at step S202, "SCAN" has been selected as the uploading method of the electronic data, (SCAN at step S202), the process advances to step S203. At step S203, the control section 120 transmits scan/media identification information which indicates that the uploading method which has been selected by the user is "SCAN", to the intermediary apparatus 200.

At step S204, the control section 120 makes a judgment of whether or not scan setting screen data has been received from the intermediary apparatus 200. The scan setting screen data is data for displaying scan setting screen on the display section 150. The scan setting screen is a screen for receiving an input of various scan settings such as a setting of as to whether an image printed on a paper is to be read in color or to be read in monochrome, and a setting of as to by what sort of resolution the image printed on the paper is to be read. In a case in which the scan setting screen data has not been received (NO at step S204), the process returns to step S204, and in a case in which the scan setting screen data has been received (YES at step S204), the process advances to step S206. At step S206, the control section 120 displays the scan setting screen on the display section 150.

At step S228, the control section 120 makes a judgment of whether or not an input of scan setting by the user has been received. In a case in which the input of scan setting has not been received (NO at step S228), the process returns to step S228, and in a case in which the input of scan setting has been received (YES at step S228), the process advances to step S229. At step S229, the control section 120 transmits scan setting information to the intermediary apparatus 200. The scan setting information is information which indicates setting contents of the scan setting.

Figure 12:
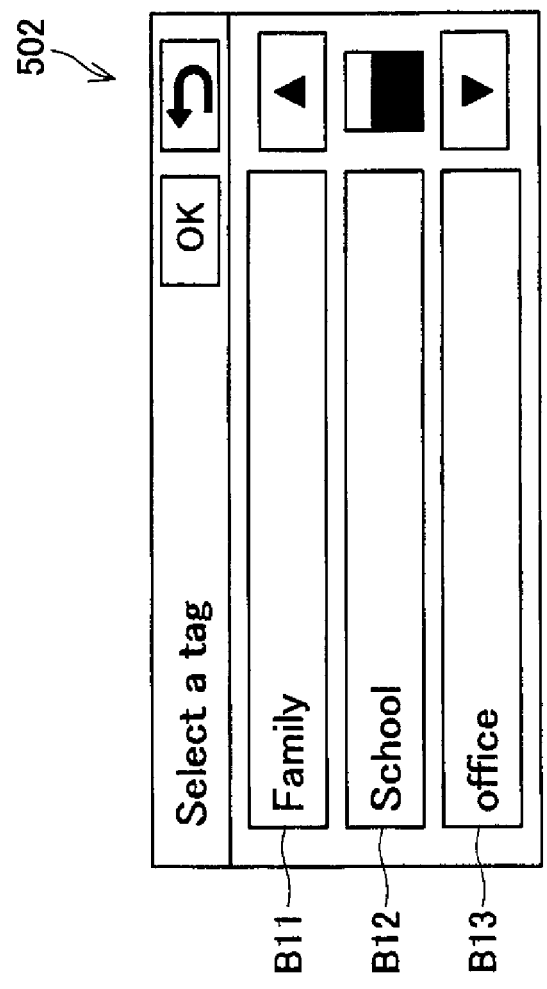
FIG. 12 is a diagram showing an example of a tag selection screen in the display section.

At step S230, the control section 120 makes a judgment of whether or not tag selection screen data has been received from the intermediary apparatus 200. The tag selection screen data is data for displaying tag selection screen on the display section 150. The tag selection screen is a screen for receiving a selection of tag data to be matched with electronic data uploaded to the service. A list of candidates for tag may be displayed on the tag selection screen. In a case in which the tag selection screen data has not been received (NO at step S230), the process returns to step S230, and in a case in which the tag selection screen data has been received (YES at step S230), the process advances to step S232. At step S232, the control section 120 displays the tag selection screen on the display section 150. A tag selection screen 502 in the embodiment is shown in FIG. 12. A button image B11, a button image B12, and a button image B13 are displayed on the tag selection screen 502.

At step S234, the control section 120 makes a judgment of whether or not a selection of tag by the user has been received or not. A method of receiving tag selection may be a method of receiving a tag which has been assigned to a button image touched by the user on the tag selection screen 502, as a tag received by the user. Moreover, a selection of a plurality of tags may also be received. In a case in which the selection of tag has not been received (NO at step S234), the process returns to step S234, and in a case in which the selection of tag has been received (YES at step S234), the process advances to step S236. At step S236, the control section 120 transmits selected-tag identification information to the intermediate apparatus 200. The selected-tag identification information is information for identifying tag data which has been selected by the user. The selected-tag identification information may be tag data which has been selected or may be an identification ID of the tag data which has been selected.

At step S238, the control section 120 makes a judgment of whether or not an upload execution command has been received from the intermediary apparatus 200. The upload execution command is a command which makes the multi-function device 100 execute a processing of uploading electronic data to the service providing device 300A. In a case in which the upload execution command has not been received (NO at step S238), the process returns to step S238, and in a case in which the upload execution command has been received (YES at step S238), the process advances to step S239.

At step S239, the control section 120 makes a judgment of whether the upload method selected at step S202 was the "MEDIA" or the "SCAN". In a case in which the "MEDIA" has been selected (MEDIA at step S239), the process advances to step S246, and in a case in which the "SCAN" has been selected (SCAN at step S239), the process advances to step S240. At step S240, reading of image is carried out. Concretely, as the user sets a paper having recorded a predetermined image, in the scanner section 170 and presses a reading start button of the operating section 180, the control section 120 makes the scanner section 170 read the image recorded, and creates electronic image from image data which has been read. The scanner section 170 carries out reading of the image based on the scan setting which has been input at step S228. Thereafter, the process advances to step S246.

At step S246, the control section 120 transmits an upload-destination URL acquisition request to the intermediary apparatus 200. Service identification information and user-specific information are included in the upload-destination URL acquisition request. For the service identification information, the service identification information stored in the RAM 123 at step S197 mentioned above may be used. For the user-specific information, the user-specific information stored in the information storage section 130 may be used.

At step S247, the control section 120 makes a judgment of whether or not first combination information, an upload-destination URL, and a template of an upload message have been received from the intermediary apparatus 200. The first combination information is information in which result information destination address and the selected-tag identification information are combined. The result-information destination address is information for specifying a destination at the time of transmitting distinction result information created in the intermediate apparatus 200 at step S466, to the multifunction device 100 at step S476. In a case in which information such as the first combination information has not been received (NO at step S247), the process returns to step S247, and in a case in which information such as the first combination information has been received (YES at step S247), the process advances to step S248.

At step S248, the control section 120 creates an upload message based on the template which has been received, the upload-destination URL which has been received, and the electronic data created at step S240 or the electronic data selected at step S211. Concretely, the multifunction device 100 stores various information such as binary data of the electronic data, the upload-destination URL, and data size of the electronic data at a predetermined position of the template which has been received from the intermediary apparatus 200. Accordingly, it is possible to create an upload message corresponding to the service A. At step S249, the control section 120 transmits the upload message to the service providing device 300A of the service A.

At step S254, the control section 120 makes a judgment of whether or not upload result information and electronic-data identification information have been received from the service providing device 300A. The upload result information is information which indicates whether the electronic data has been uploaded normally to the service providing device 300A. The electronic-data identification information is information for identifying the electronic data which has been uploaded normally to the service providing device 300A. A file ID can be cited as an example of the electronic-data identification information. In a case in which the upload result information has not been received (NO at step S254), the process returns to step S254, and in a case in which the upload result information has been received (YES at step S254), the process advances to step S258.

At step S258, the control section 120 generates second combination information, and transmits to the intermediary apparatus 200. The second combination information is information in which upload notification information and upload result information are further combined with the first combination information. The upload notification information is information which includes tagging request information and electronic-data identification information. In such manner, since the second combination information has a hierarchical structure which includes various information, it is possible to transmit various information such as the upload result information and the tagging request information by one request.

Moreover, the second combination information includes the upload result information in a form as received from the service providing device 300A. This is because the upload result information cannot be decoded in the multifunction device 100, since the content of the upload result information varies from service to service. Moreover, this is for transmitting the upload result information to the intermediary apparatus 200, and making the intermediary apparatus 200 decode the upload result information.

At step S262, the control section 120 makes a judgment of whether or not distinction result information and tagging result information have been received from the intermediary apparatus 200. The distinction result information is information which indicates whether or not the electronic data has been uploaded normally. The distinction result information is information which is subjected to conversion processing in the intermediary apparatus 200, to enable decoding in the multifunction device 100. The tagging result information is information which indicates whether or not tag data could be matched normally with the electronic data which was uploaded. In a case in which the distinction result information and the tagging result information have not been received (NO at step S262), the process returns to step S262, and in a case in which the distinction result information and the tagging result information have been received (YES at step S262), the process advances to step S263. At step S263, the control section 120 displays success or failure of uploading on the display section 150, based on the distinction result information and the tagging result information. Accordingly, the user is capable of verifying whether the uploading has succeeded. Moreover, in a case in which the uploading has succeeded; it is possible to verify as to where the electronic data which was uploaded has been stored.

At step S264, the control section 120 verifies the distinction result information which has been received. In a case in which it is found that the upload processing is completed normally (YES at step S264), the process advances to step S268, and in a case in which it is found that the upload processing is not completed normally (NO at step S264), the process advances to step S265. At step S265, the control section 120 makes a judgment of whether or not the content of an error occurred is an error with which the upload processing can be continued. An error in which the communication with the service providing device 300A cannot be carried out normally, and there is a defect in the service providing device 300A or the network 400, can be cited as an example of an error with which the upload processing cannot be continued. Moreover, an error in a case in which the communication with the service providing device 300A can be carried out normally, but electronic data which has been uploaded could not be transmitted normally due to some reason can be cited as an example of an error with which the upload processing can be continued.

In a case that there is an error with which the upload processing cannot be continued (NO at step S265), the process advances to step S266, and the control section 120 displays that the error with which the upload processing cannot be continued has occurred, on the display section 150. Thereafter, the processing is terminated. Whereas, in a case that there is an error with which the upload processing can be continued (YES at step S265), the control section 120 stores flag information which indicates that the error with which the upload processing can be continued, in the information storage section 130. Thereafter, the process advances to step S268.

At step S268, the control section 120 makes a judgment of whether or not there is another image to be read by the scanner section 170, or whether or not there is electronic data in the memory card 141, which is to be uploaded. In a case that there exists electronic data related to image read by the scanner section 170 or in a case that there exists electronic data in the memory card 141, which is to be uploaded (YES at step S268), the process returns to step S246. Whereas, in a case that there exists no image which is to be read by the scanner section 141, and there exists no electronic data in the memory card 141 as well, which is to be uploaded (NO at step S268), the process advances to step S269. At step S269, the control section 120 makes a judgment of whether or not the error with which the upload processing can be continued has occurred, according to presence or absence of flag information stored in the information storage section 130. In a case that the error with which the upload processing can be continued has occurred (YES at step S269), the process advances to step S280, and the control section 120 displays on the display section 150 that the error with which the upload processing can be continued has occurred. Thereafter, the control section 120 terminates the processing. Whereas, in a case that the error with which the upload processing can be continued has not occurred (NO at step S269), the process advances to step S281, and the control section 120 displays on the display section 150 that the processing is completed normally, and terminates the processing.

<Operation of Intermediary Apparatus 200>

An operation in detail of the intermediary apparatus 200 will be described below by referring to FIG. 6A, FIG. 6B, FIG. 7A, FIG. 7B, FIG. 8A and FIG. 8B (hereinafter, referred to as "FIG. 6A to FIG. 8B"). In the following description, an expression "the control section 220 receives information" means that the CPU 221 acquires information received by the communication section 210, from the communication section 210 via a buffer or the RAM 223. Moreover, an expression "the control section 220 transmits information" means that the CPU 221 outputs information to the buffer or the RAM 223, and transmits that information via the communication section 210. As the relay computer program stored in the information storage section 230 is activated, the control section 220 of the intermediary apparatus 200 starts processing shown in FIG. 6A to FIG. 8B, according to various computer programs stored in the information storage section 230. In the embodiment, as an example, a processing in a case in which the service A is selected as the upload-destination of electronic data, will be described below.

At step S404, the control section 220 makes a judgment of whether or not the service identification information has been received from the multifunction device 100. In a case in which the service identification information has not been received from the multifunction device 100 (NO at step S404), the process returns to step S404, and in a case in which the service identification information has been received from the multifunction device 100 (YES at step S404), the process advances to step S406. At step S406, the control section 220 generates scan/media selection screen data, and transmits to the multifunction device 100.

At step S408, the control section 220 makes a judgment of whether or not scan/media identification information has been received from the multifunction device 100. In a case in which the scan/media identification information has not been received from the multifunction device 100 (NO at step S408), the process returns to step S408, and in a case in which the scan/media identification information has been received from the multifunction device 100 (YES at step S408), the process advances to step S409.

At step S409, the control section 220 makes a judgment of whether the uploading method which has been selected by the user is "SCAN" or "MEDIA", based on the scan/media identification information. In a case in which the uploading method is "SCAN" (SCAN at step S409), the process advances to step S410, and the control section 220 generates scan setting screen data and transmits to the multifunction device 100. At step S413, the control section 220 makes a judgment of whether or not the scan setting information has been received from the multifunction device 100. In a case in which the scan setting information has not been received from the multifunction device 100 (NO at step S413), the process returns to step S413, and in a case in which the scan setting information has been received from the multifunction device 100 (YES at step S413), the process advances to step S414.

Whereas, when the uploading method is "MEDIA" at step S409 (MEDIA at step S409), the process advances to step S411, and the control section 220 generates the electronic-data selection screen data, and transmits to the multifunction device 100. At step S412, the control section 220 makes a judgment of whether or not the electronic-data selection completion information has been received from the multifunction device 100. In a case in which the electronic-data selection completion information has not been received from the multifunction device 100 (NO at step S412), the process returns to step S412, and in a case in which the electronic-data selection completion information has been received from the multifunction device 100 (YES at step S412), the process advances to step S414.

At step S414, the control section 220 makes a judgment of whether or not a service which has been selected corresponds to the tag. This judgment may be made by storing in advance the correspondence of each service to the tag in the information storage section 230. In a case in which the service selected does not correspond to the tag (NO at step S414), the process advances to step S430, and in a case in which the service selected corresponds to the tag (YES at step S414), process advances to step S418.

At step S418, the control section 220 transmits the tag-list request information to the service providing device 300A of the service A which has been selected by the user. The tag-list request information is information for making a request for a tag list, to the service providing device 300A. The tag list is information which includes a plurality of tag data and plurality of tag identification information which identifies respective tag data. The tag-list request information is information having a specification unique to service A. Therefore, by creating and transmitting the tag-list request information by using the tag-list request computer program stored in the information storage section 230, it is possible to associate the tag-list request information with the specification of the service A.

At step S420, the control section 220 acquires the tag list from the service providing device 300A. At step S422, the control section 220 makes a judgment of whether or not tag data exists in the tag list. For instance, in a case in which a capacity of the tag list is smaller than a predetermined capacity, a judgment that there does not exist the tag data, may be made. In a case in which the tag data does not exist in the tag list (NO at step S422), the process advances to step S430, and in a case in which the tag data does exist in the tag list (YES at step S422), the process advances to step S423.

At step S423, the control section carries out a rearranging processing of the tag data in the tag list. Concretely, the control section 220 interchanges, a display order of the plurality of tag data such that tag data with a high priority order is displayed first on the display section 150 of the multifunction device 100. The priority order may be of various modes. For instance, the priority order of tag data with high frequency of usage may be let to be high, or the priority order of tag data with recent update history may be let to be high. At step S424, the control section 220 creates the tag-selection screen data based on the tag list. The tag-selection screen data is data for displaying a tag selection screen on the display section 150 of the multifunction device 100. The tag-selection screen data includes the plurality of tag data included in the tag list. At step S426, the control section 220 transmits the tag-selection screen data to the multifunction device 100.

At step S428, the control section 220 makes a judgment of whether or not the selected-tag identification information has been received from the multifunction device 100. In a case that the selected-tag identification information has not been received from the multifunction device 100 (NO at step S428), the process returns to 428, and in a case that the selected-tag identification information has been received from the multifunction device 100 (YES at step S428), the process advances to step S430. At step S430, the control section 220 generates the upload execution command.

At step S432, the control section 220 makes a judgment of whether or not the selected-tag identification information has been received from the multifunction device 100 at step S428. In a case that the selected-tag identification information has not been received from the multifunction device 100 at step S428 (NO at step S432), the process advances to step S436, and in a case that the selected-tag identification information has been received from the multifunction device 100 at step S428 (YES at step S432), the process advances to step S434. At step S434, the control section 220 adds the selected-tag identification information to the upload execution command. At step S436, the control section 220 transmits the upload execution command to the multifunction device 100.

At step S440, the control section 220 makes a judgment of whether or not the upload-destination URL acquisition request has been received from the multifunction device 100. In a case that the upload-destination URL acquisition request has not been received from the multifunction device 100 (NO at step S440), the process returns to step S440, and in a case that the upload-destination URL acquisition request has been received from the multifunction device 100 (YES at step S440), the process advances to step S442.

AT step S442, the control section 220 creates the upload-information request information and transmits to the service providing device 300A. The upload-information request information is information for making a request to the service A, for an upload-destination URL which is information necessary for carrying out an upload to the service. The upload-information request information is information which has a specification unique to the service A. Therefore, by creating and transmitting the upload-information request information by using the URL acquisition computer program 232 which has been stored in the information storage section 230, it is possible to associate the upload-information request information with the specification of service A. The upload-information request information created at this time is an HTTP message for which an API released by the service A has been used.

The specification of the upload-information request information will be described below. Information included in the upload-information request information sometimes varies from service to service. For instance, in a case that information for specifying a position of storage of electronic data of that service such as an album ID is necessary for an electronic-data storage service to specify an upload-destination URL, an album ID of an album which is used by the user is included in the upload-information request information. Moreover, for instance, in a case that information for specifying a position of storage of electronic data of that service, such as a folder name is necessary for the electronic-data storage service to specify an upload-destination URL, a folder name which is used by the user is included in the upload-information request information. Related information such as album ID and folder name which the user is using may have been stored in advance in the information storage section 230.

At step S444, the control section 220 makes a judgment of whether or not the upload-destination URL has been received from the service providing device 300A. In a case in that the upload-destination URL has not been received from the service providing device 300A (NO at step S444), the process returns to step S444, and in a case that the upload-destination URL has been received from the service providing device 300A (YES at step S444), the process advances to step S446.

At step S446, the control section 220 creates a template of an upload message and first combination information. The first combination information is created by combining a result information destination address and the selected-tag identification information.

A specification of the upload message sometimes, is unique to the service A. Therefore, by creating the template of the upload message by using the template creating computer program 234 which has been stored in the information storage section 230, it is possible to associate the template of the upload message with the specification of the service A. The upload message, concretely, is a request message of HTTP. However, the types and the number of information to be put into a header and information to be put into a request body vary from the service to service. For instance, there may be a service for which it is necessary to put in information such as the file name of the electronic data apart from binary data of the electronic data, in the request body, and there may be a service for which it is necessary to put in only the binary data of the electronic data in the request body, and to put in information such as a file name, in the header.

At step S448, the control section 220 transmits the first combination information, the upload-destination URL, and the template of the upload message to the multifunction device 100.

At step S462, the control section 220 makes a judgment of whether or not the second combination information has been received from the multifunction device 100. In a case that the second combination information has not been received from the multifunction device 100 (NO at step S462), the process returns to step S462, and in a case that the second combination information has been received from the multifunction device 100 (YES at step S462), the process advances to step S466. At step S466, the control section 220 decodes upload result information included in the second combination information, and creates a decoding result. The upload result information being information which has been transmitted to the multifunction device 100 from the service providing device 300A via the intermediary apparatus 200, the upload result information has a specification unique to the service A. Therefore, by using the decoding computer program 235 which has been stored in the information storage section 230, it is possible to decode the upload result information. The decoding result is a message of a format which is decodable by the multifunction device 100. The decoding result includes an upload result included in the upload result information which has been decoded.

At step S468, the control section 220 makes a judgment of whether or not the selected-tag identification information has been included in the first combination information included in the second combination information which has been received at step S462. In a case that the selection tag information has not been included in the first combination information (NO at step S468), the process advances to step S476, and in a case that the selection tag information has been included in the first combination information (YES at step S468), the process advances to step S470.

At step S470, the control section 220 transmits the electronic data identification information and the tagging instruction information to the service providing device 300A. The tagging instruction information is information for requesting the service providing device 300A to associate tag data, which is identified by the selected-tag identification information, with the electronic data which the service A identifies based on the electronic-data identification information. The tagging instruction information is information having a specification unique to the service A. Therefore, by creating and transmitting the tagging instruction information by using the tagging instruction computer program 231 which has been stored in the information storage section 230, it is possible to associate the tagging instruction information with the specification of the service A.

At step S472, the control section 220 acquires tagging result information from the service providing device 300A. At step S474, the control section 220 updates the priority-order database 250. At step S476, the control section 220 transmits the distinction result information and the tagging result information to the multifunction device 100. Thereafter, the control section 220 terminates the flow.

<Operation of Service Collaboration System 10>

An example of an operation of the service collaboration system 10 will be described below by referring to sequence diagrams in FIG. 9A, FIG. 9B, FIG. 10A and FIG. 10B. In the following description, a flow in a case that the user of the multifunction device 100 has selected to upload electronic data of an image read by the scanner section 170 will be described. Moreover, a flow in a case that the user has selected the service A as an upload destination of the electronic data will be described.

As the user selects the service A as a service for uploading the electronic data (YES at step S196) by operating the operating section 180 of the multifunction device 100, the multifunction device 100 transmits the service identification information to the intermediary apparatus 200 (step S197). As the intermediary apparatus 200 receives the service identification information from the multifunction device 100 (YES at step S404), the intermediary apparatus 200 generates the scan/media selection screen data, and transmits to the multifunction device 100 (step S406). As the multifunction device 100 receives the scan/media selection screen data from the multifunction device 200 (YES at step S198), the multifunction device 100 displays the scan/media selection screen data on the display section 150 (step S200).

As the user selects "SCAN" as the uploading method (SCAN at step S202), the multifunction device 100 transmits the scan/media identification information to the intermediary apparatus 200 (step S203). As the intermediary apparatus 200 receives the scan/media identification information from the multifunction device 100 (YES at step S408), the intermediary apparatus 200 generates the scan setting screen data, and transmits to the multifunction device 100 (step S410). As the multifunction device 100 receives the scan setting screen data from the intermediary apparatus 200 (YES at step S204), the multifunction device 100 displays the scan setting screen on the display section 150 (step S206).

As the user inputs scan setting (YES at step S228), the multifunction device 100 transmits scan setting information to the intermediary apparatus 200 (step S229). As the intermediary apparatus 200 receives the scan setting information from the multifunction device 100 (YES at step S413), the intermediary apparatus 200 transmits the tag-list request information to the service providing device 300A (step S418). As the intermediary apparatus acquires the tag list from the service providing device 300A (step S420), the intermediary apparatus carries out rearranging processing of the tag data included in the tag list (step S423). The intermediary apparatus 200 creates the tag selection screen based on the tag list (step S424), and transmits the tag-selection screen data which has been created, to the multifunction device 100 (step S426). As the multifunction device 100 receives the tag-selection screen data (YES at step S230), the multifunction device 100 displays the tag-selection screen data on the display section 150 (step S232).

As the user selects a tag to match with the electronic data to be uploaded (YES at step S234), the multifunction device 100 transmits the selected-tag identification information to the intermediary apparatus 200 (step S236). As the intermediary apparatus 200 receives the selected-tag identification information from the multifunction device 100 (YES at step S428), the intermediary apparatus 200 generates the upload execution command (step S430), and adds the selected-tag identification information to the upload execution command (step S424). The intermediary apparatus 200 transmits the upload execution command to the multifunction device 100 (step S436). As the multifunction device 100 receives the upload execution command from the intermediary apparatus 200 (YES at step S238), the multifunction device 100 executes reading of an image (step S240).

The multifunction device 100 transmits the upload-destination URL acquisition request to the intermediary apparatus 200 (step S246). As the multifunction device 200 receives the upload-destination URL acquisition request from the multifunction device 100 (YES at step S440), the intermediary device 200 transmits the upload-information request information to the service providing device 300A (step S442). As the intermediary apparatus 200 receives the upload-destination URL from the service providing device 300A (YES at step S444), the intermediary apparatus 200 creates the template of the upload message and the first combination information (step S446). The intermediary apparatus 200 transmits the first combination information, the upload-destination URL, and the template of the upload message, to the multifunction device 100 (step S448). As the multifunction device 100 receives the first combination information, the upload-destination URL, and the template of the upload message from the intermediary apparatus 200 (YES at step S247), the multifunction device 100 creates the upload message (step S248). The multifunction device 100 transmits the upload message to the service providing device 300A (step S249). As the multifunction device 100 receives the upload result information and the electronic-data identification information from the service providing device 300A (YES at step S254), the multifunction device 100 generates the second combination information and transmits to the intermediary apparatus 200 (step S258).

As the intermediary apparatus 200 receives the second combination information from the multifunction device 100 (YES at step S462), the intermediary apparatus 200 decodes the upload result information, and creates the decoding result. The intermediary apparatus 200 transmits the electronic-data identification information and the tagging instruction information to the service providing device 300A (step S470). As the intermediary apparatus 200 receives the tagging result information from the service providing device 300A (step S472), the intermediary apparatus 200 updates the priority-order database 250 (step S474). The intermediary apparatus 200 transmits the distinction result information and the tagging result information to the multifunction device 100 (step S476). As the multifunction device 100 receives the distinction result information and the tagging result information from the intermediary apparatus 200 (YES at step S262), the multifunction device 200 displays the success or the failure of uploading on the display section 150.

In a case that electronic data related to an image read by the scanner section 170 has been recorded in the information storage section 130 apart from the electronic data for which the uploading is completed (YES at step S268), processing from processing of acquiring the upload-destination URL (step S246) up to processing of displaying the success or the failure of upload (step S263) is executed once again. Moreover, as the upload of the data related to all the images is completed (NO at step S268), the multifunction device 100 displays on the display section 150, that the processing is completed normally (step S281).

<Effect>

In the service collaboration system 10 described in the embodiment, it is possible to execute processing of matching the tag data with the electronic data which has been uploaded to the electronic-data storage service from the multifunction device 100 (examples: steps S418 and S470), in the intermediary apparatus 200. Accordingly, a need to store in the multifunction device 100, the computer program for executing the processing of matching the tag information (such as the tag-list request computer program 233 and the tagging instruction computer program 231) is eliminated. Moreover, a need to make the multifunction device 100 execute updating of these computer programs is eliminated. Therefore, it is possible to prevent a situation in which a capacity of the information storage section 130 of the multifunction device 100 is to be compressed, and a situation in which a communication capacity or the processing capacity of the multifunction device 100 is to be compressed.

The intermediary apparatus 200 is capable of receiving the electronic-data identification information for the electronic-data storage service to identify the electronic data which has been successfully uploaded to the electronic-data storage service (step S462 for example). Therefore, it is possible to execute the processing of matching the tag information with the electronic data (step S470 for example), in the intermediary apparatus 200.

It is possible to display the tag selection screen for receiving the selection of the tag data to be matched with the electronic data to be uploaded, on the display section of the multifunction device 100 (step S232 for example). Moreover, it is possible to determine the tag selected by the user from the plurality of candidates of tag, as the tag data to be matched with the electronic data (step S234 for example). Accordingly, since it is possible to let an operation of inputting the tag data to be unnecessary, it is possible to improve convenience for the user.

It is possible to transfer to the intermediary apparatus 200, the upload result information which is transmitted from the service providing device 300 (step S258 for example), upon receiving by the multifunction device 100 (step S254 for example), and to decode the upload result information in the intermediary apparatus 200 (step S466 for example). Accordingly, since the content of the upload result information varies for each of the electronic-data storage service, even in a case that it is not possible to decode the upload result information in the multifunction device 100, it is possible to distinguish between success and failure of the storage processing in the electronic-data storage service.

The intermediary apparatus 200 is capable of receiving the tagging request information of matching the tag data to the electronic data, together with the upload result information (step S462 for example). Accordingly, the intermediary apparatus 200 is capable of matching the tag data with the electronic data upon acknowledging that the uploading of the electronic data has succeeded. Therefore, it is possible to carry out assuredly the matching of the tag information. Moreover, it is possible to receive the upload result information and the tagging request information by a reception operation once, namely by one reception operation. Therefore, it is possible to reduce a communication frequency between the multifunction device 100 and the intermediary apparatus 200.

By including the tag data etc. in the result information destination address which is information for specifying the destination at the time of transmitting the distinction result information created in the intermediary apparatus 200 to the multifunction device 100, it is possible to handle these information integrally (step S446 for example). Moreover, by combining the upload notification information and the upload result information with the first combination information, it is possible to handle these information integrally (step S258 for example). In other words, by embedding the tag data etc. in various information exchanged between the multifunction device 100 and the intermediary apparatus 200, it is possible to eliminate a need to keep the tag data etc. stored in the intermediary apparatus 200. Therefore, it is possible to improve an ease of handling data such as the tag data.

An amount of information which can be displayed on the display section 150 of the multifunction device 100 is smaller as compared to an amount of information displayed on a display section of a personal computer etc. In the service collaboration system 10 described in the embodiment, it is possible to display data with a high priority order on the display section 150 of the multifunction device 100 preferentially (step S423 for example). Accordingly, it is possible to display the tag information on the display section 150 of the multifunction device 100, to be easily noticeable by the user.

The embodiment of the present invention has been described above in detail. However, the embodiment described above is only an exemplification, and does not restrict the scope of claims for patent. Various modifications and changes made in the illustrative embodiment are included in the technology described in the scope of the claims for patent.

<Modified Embodiments>

The information included in the first combination information and the second combination information is of one type. Information of another type may also be included in the first combination information and the second combination information, or it may be a type in which the information described in the embodiment is not included.

An arrangement in which a hierarchical structure is used in the first combination information and the second combination information has been described. (For instance, a case of the second combination information having a structure in which the upload notification information and the upload result information are combined with the first combination information has been described. Moreover, a case in which the upload notification information includes the tagging request information and the electronic-data identification information has been described.) However, since the capability to communicate information which is necessary for each processing, serves the purpose, the type of the hierarchical structure may be various. For instance, the second combination information may be of a type which includes information such as the result information destination address, the selected-tag identification information, the tagging request information, the electronic-data identification information, and the upload result information.

Sometimes, the tag which is to be matched with the electronic data is a tag unique to the electronic-data storage service. A tag indicating a degree of importance by the number of asterisks or a tag of a pictographic script can be cited as an example of the tag unique to the electronic-data storage service. In this case, an arrangement may be made such that, at step S424a instead of step S424, the control section creates the tag-selection screen data upon converting the data indicating the tag unique to the service, to data which can be displayed on the display section 150 of the multifunction device 100. A mode of converting the number of asterisks to a numeral or a mode of converting a content indicated by a pictorial script to a character string can be cited as an example of a conversion mode. Moreover, an arrangement may be made such that, in a case that the selected-tag identification information has been received from the multifunction device 100 (YES at step S428), at step S434a instead of step S434, upon reconverting the selected-tag identification information to a tag unique to the service, the selected-tag identification information after the reconversion is added to the upload execution command (step S434). A mode of converting a numeral to the number of asterisks or a mode of converting a character string to a pictographic script corresponding to a content of the character string can be cited as an example of a reconversion mode. Accordingly, it is possible to handle a tag which cannot be displayed on the display section 150 of the multifunction device 100.

An arrangement may be made such that, in a case that it is not possible to acquire the tag list from the service providing device 300 at step S420 or in a case that the tag data does not exist in the tag list at step S422, a command for making a creation of a tag received by the multifunction device 100, may be transmitted to the multifunction device 100 at step S426a instead of step S426. The multifunction device 100 which has received the command may display on the display section 150, a tag creating screen for receiving an input of a character string of the tag, at step S232a instead of step S232. Moreover, at step S234a instead of step S234, the process may advance to step S236a instead of step S236 in response to receiving the input of the character string (YES at step S234a). At step S236a, the multifunction device 100 may transmit the selected-tab identification information which identifies the character string of the tag created by the user, to the intermediary apparatus 200. Accordingly, in a case that a candidate for selection of tag does not exist, since the tag creating screen is displayed automatically on the display section 150, it is possible to improve the convenience for the user.

The abovementioned description according to the flowchart is an example, and does not restrict the present invention. In a case of a service such as flickr (registered trademark), in which after the uploading of the electronic data is completed, it is necessary to let the electronic data which has been uploaded, to be subjected to mapping in a predetermined album, the intermediary apparatus 200 may carry out the following processing. The intermediary apparatus 200 which has received a decoding request, at step S466a instead of step S466, creates a decoding result by decoding the upload result information from the service providing device 300, as well as transmits to the service providing device 300, an instruction for mapping the electronic data which has been uploaded, in the predetermined album which has been determined in advance. Moreover, an arrangement may be made such that, at step S476a instead of step S476, information which indicates that that the electronic data has been uploaded to the album for which the instruction for mapping in the service providing device 300 was given, is transmitted to the multifunction device 100.

A case, in which the control section 220 of the intermediary apparatus 200 creates the template of the upload message at step S446, has been described. However, the present invention is not restricted to such arrangement. For instance, an arrangement may be made such that, the template corresponding to each service is stored in advance in the information storage section 230, and the intermediary apparatus 200 transmits the template which has been stored in the information storage section 230, to the multifunction device 100.

In the embodiment, an arrangement in which the upload result information which the multifunction device 100 has received from the service providing device 300 is transferred to the intermediary apparatus 200, and the intermediary apparatus 200 is made to carry out decoding of the upload result information has been described. However, the present invention is not restricted to such arrangement, and a processing of carrying out decoding of the upload result information may be omitted. In this case, the processing of creating the decoding result at step S466 may be omitted. Moreover, an arrangement may be such that, the upload result information has not been included in the second combination information which is generated at step S258.

Figure 13:
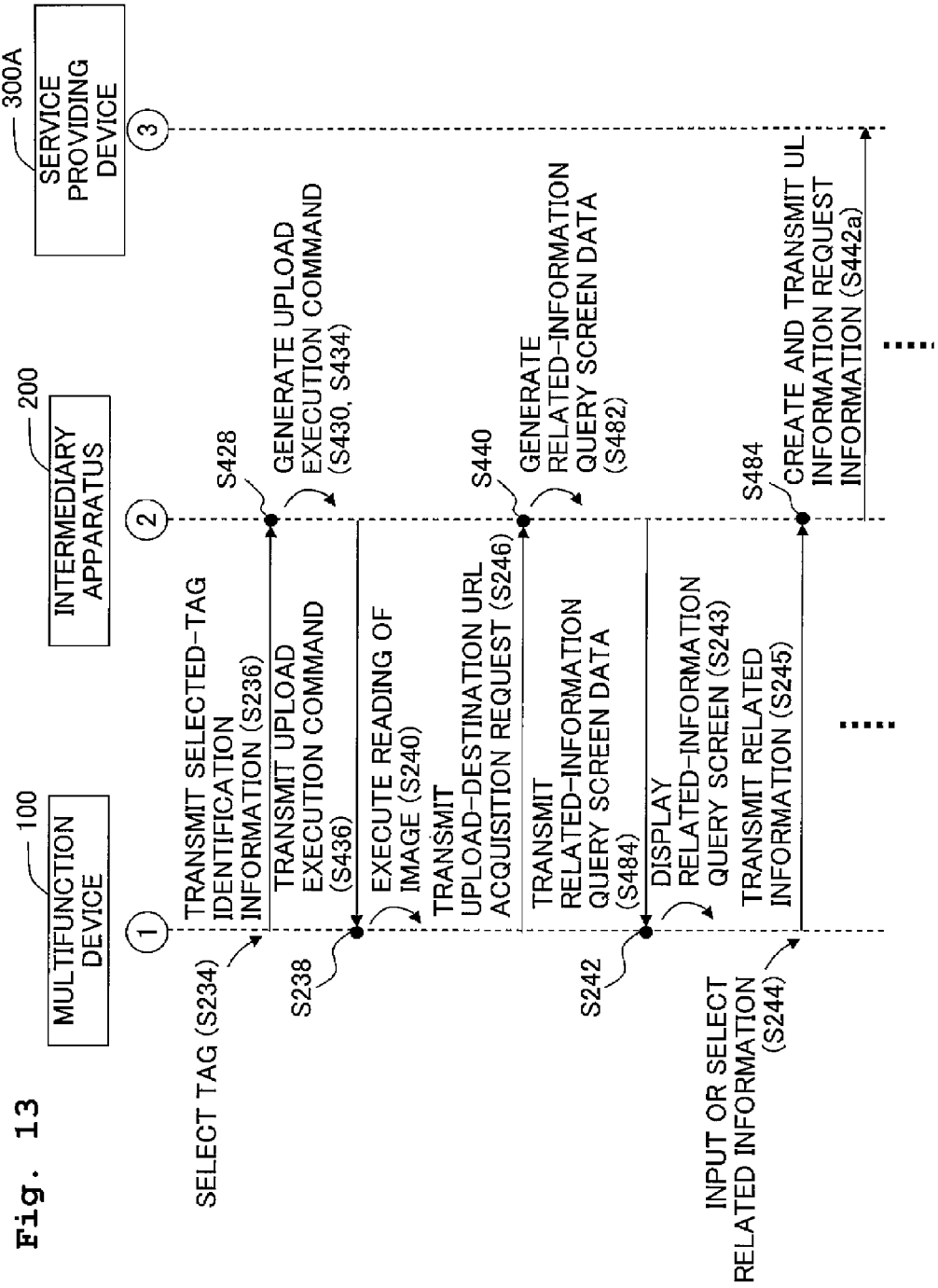
FIG. 13 is a modified example of the sequence diagram in FIGS. 10A and 10B.

A case of using the related information which has been stored in advance in the information storage section 230 in a case of the control section 220 of the intermediary apparatus 200 creating the upload-information request information has been described in the embodiment. However, the present invention is not restricted to such arrangement. For example, an arrangement may be such that, the intermediary apparatus 200 makes a query for related information which is necessary for the multifunction device 100 as in a modified embodiment in a sequence diagram in FIG. 13. The arrangement will be described below more precisely. As the intermediary apparatus 200 receives the upload-destination URL acquisition request from the multifunction device 100 (YES at step S440), the intermediary apparatus 200 generates related-information query screen data (step S482), and transmits to the multifunction device 100 (step S484). In this case, the intermediary apparatus 200 creates a query screen corresponding to each service, in a markup language such as an XML (abbreviation for EXtensible Markup Language). This is because the type of related information which is to be input or selected by the user varies from service to service. As the multifunction device 100 receives the related-information query screen data (step S242), the multifunction device 100 displays the related-information query screen on the display section 150 (step S243), and inputs or selects the related information to the user. Concretely, the multifunction device 100, by carrying out rendering based on the related-information query screen data which has been received, displays the related-information query screen corresponding to the service which has been specified to the user. As the user inputs or selects the related information (step S244), the multifunction device 100 transmits the related information which has been inputted or selected by the user to the intermediary apparatus 200 (step S245). As the intermediary apparatus 200 receives the related information from the intermediary apparatus 200 (step S484), the intermediary apparatus 200 creates the upload-information request information by using the related information which has been received (step S442a). Moreover, the intermediary apparatus 200 transmits the upload-information request which has been created, to the service providing device 300A (step S442a). The processing here onward being similar to the abovementioned processing, the description thereof will be omitted. As described heretofore, the multifunction device 100, when provided with a rendering driver for a message described in a markup language such as XML, is capable of displaying a query screen corresponding to each service. Therefore, it is possible to make user, input or select the related information corresponding to each service. By carrying out such interactive processing before transmitting some sort of request message from the intermediary apparatus 200 to the service providing device 300, not only before transmission of the upload-information request information, it is possible to carry out collaboration with various services easily.

In the abovementioned embodiment, a URL has been used as an address of upload destination. However, the present invention is not restricted to such arrangement. It may be information which is to be added as an option to the URL, or may be information which is included in a body portion of HTTP communication.

Modes by which the multifunction device 100 and the intermediary apparatus 200 carry out uploading of electronic data in collaboration may be various, and it may be an arrangement as described below. The intermediary apparatus 200 acquires from the electronic-data storage service, an upload-destination URL which is a URL of a destination of upload of the electronic data to the electronic-data storage service. The multifunction device 100 transmits the electronic data which is to be uploaded, to the intermediary apparatus 200. The intermediary apparatus 200 uploads the electronic data to the electronic-data storage service by using the upload-destination URL.

The multifunction device 100 is an example of an image processing apparatus. The service providing devices 300A and 300B are examples of services. The tagging instruction computer programs 231 and 241 are examples of first processing execution information. The upload-destination URL is an example of upload information. The URL acquisition computer programs 232 and 242 are examples of second processing execution information. The tag-list request computer programs 233 and 243 are example of a third processing execution information.

What is claimed is:

1. An intermediary apparatus configured to be connectable to an image processing apparatus and to a service configured to store electronic data which has been uploaded, via networks, the intermediary apparatus comprising:
   a communication interface configured to be connectable to the image processing apparatus via a first network, and connectable to the service via a second network; and
   a controller configured to:
      acquire tagging request information, which is transmitted from the image processing apparatus, for requesting to associate tag data with electronic data which has been uploaded to the service from the image processing apparatus;
      acquire upload notification information, which is transmitted from the image processing apparatus, indicating that the electronic data has been uploaded from the image processing apparatus to the service;
      output tagging instruction information for requesting to associate the tag data with the electronic data which has been uploaded from the image processing apparatus and stored in the service in response to acquiring the tagging request information and the upload notification information; and
      control the communication interface to transmit the tagging instruction information to the service,
   wherein the service is included in a plurality of services to which the intermediary apparatus is connectable,
   wherein the controller is configured to further acquire service identification information, which is transmitted from the image processing apparatus, for identifying the service which has been selected in the image processing apparatus from among the services,
   wherein the intermediary apparatus further includes a storage section configured to store first processing execution information which is necessary for transmitting the tagging instruction information to each of the services and second processing execution information which is necessary for transmitting upload-information request information for requesting upload information to each of the services,
   wherein the upload-information request information has a specification unique to each of the services,
   wherein the controller is configured to:
      acquire the second processing execution information from the storage section, in response to acquiring the service identification information;
      output the upload-information request information corresponding to the service which has been selected in the image processing apparatus based on the second processing execution information which has been acquired;
      control the communication interface to transmit the upload-information request information to the service which has been selected in the image processing apparatus;
      acquire the upload information which has been transmitted from the service; and
      make the image processing apparatus execute upload based on the upload information which has been acquired, by controlling the communication interface to transmit the upload information which has been acquired to the image processing apparatus,
   wherein the tagging instruction information has a specification unique to each of the services, and
   wherein the controller is configured to:
      acquire the first processing execution information corresponding to the service which has been selected in the image processing apparatus from the storage section, in response to acquiring the service identification information, transmitting the upload information, and acquiring the tagging request information and the upload notification information;
      output the tagging instruction information based on the first processing execution information which has been acquired; and
      control the communication interface to transmit the tagging instruction information to the service identified by the service identification information.

2. The intermediary apparatus according to claim 1, wherein the controller is configured to further acquire electronic-data identification information, which is transmitted to the second network from the service in which the electronic data has been stored successfully, for the service to identify the electronic data which has been stored in the service successfully,
   wherein the controller is configured to output the tagging instruction information and the electronic-data identification information in response to acquiring the tagging request information, the upload notification information, and the electronic-data identification information, and
   wherein the tagging instruction information is information for requesting to associate the tag data with the electronic data which the service identifies based on the electronic-data identification information.

3. The intermediary apparatus according to claim 1, wherein the controller is configured to:
   output the tagging instruction information and electronic-data identification information, which is transmitted to the image processing apparatus from the service in which the electronic data has been stored successfully, for the service to identify the electronic data which has been stored in the service successfully, in response to acquiring the tagging request information and the upload notification information including the electronic-data identification information; and control the communication interface to transmit the tagging instruction information and the electronic-data identification information to the service.

4. The intermediary apparatus according to claim 1, wherein the controller is configured to:
further acquire electronic-data identification information, which is transmitted to the intermediary apparatus from the service in which the electronic data has been stored successfully, for the service to identify the electronic data which has been stored in the service successfully;
output the tagging instruction information and the electronic-data identification information in response to acquiring the tagging request information, the upload notification information, and the electronic-data identification information; and
control the communication interface to transmit the tagging instruction information and the electronic-data identification information to the service.

5. An intermediary apparatus configured to be connectable to an image processing apparatus and to a service configured to store electronic data which has been uploaded, via networks, the intermediary apparatus comprising:
a communication interface configured to be connectable to the image processing apparatus via a first network, and connectable to the service via a second network;
a storage section; and
a controller,
wherein the service is included in a plurality of services to which the intermediary apparatus is connectable,
wherein the controller is configured to:
acquire service identification information, which is transmitted from the image processing apparatus, for identifying the service which has been selected in the image processing apparatus from among the service;
output tag-list request information having a specification unique to the service which has been selected in the image processing apparatus in response to acquiring the service identification information, the tag-list request information being information for requesting a tag-list including a plurality of tag data and a plurality of tag identification information for identifying the plurality of tag data respectively;
control the communication interface to transmit the tag-list request information to the service which has been selected in the image processing apparatus;
acquire the tag list which has been transmitted from the service;
output the plurality of tag data and the plurality of tag identification information included in the tag list which has been acquired, in response to acquiring the tag list;
control the communication interface to transmit one of the plurality of tag data and the plurality of tag identification information to the image processing apparatus for displaying on the image processing apparatus and for being selected;
acquire one of tag data and tag identification information for identifying the tag data which has been transmitted from the image processing apparatus, the tag data being selected from the plurality of tag data and the tag identification information being selected from the plurality of tag identification information;
acquire upload notification information, which is transmitted from the image processing apparatus, indicating that the electronic data has been uploaded from the image processing apparatus to the service;
acquire tagging request information, which is transmitted from the image processing apparatus, for requesting to associate the tag data with the electronic data which has been uploaded to the service from the image processing apparatus;
output tagging instruction information for requesting to associate the tag data with the electronic data which has been uploaded from the image processing apparatus and stored in the service, in response to acquiring the tagging request information, the upload notification information, and one of the tag data and one of the tag identification information, the tagging instruction information having a specification unique to each of the services; and
control the communication interface to transmit the tagging instruction information to the service which has been selected in the image processing apparatus, and
wherein the storage section is configured to store first-processing execution information which is necessary for transmitting the tagging instruction information to each of the services and third processing execution information which is necessary for transmitting the tag-list request information for requesting the tag list to each of the services.

6. The intermediary apparatus according to claim 5, wherein the storage section is configured to store a priority order of one of the plurality of tag data and the plurality of tag identification information, and
wherein the controller is further configured to:
interchange an order of display of one of the plurality of tag data and the plurality of tag identification information according to the priority order stored in the storage section, such that the plurality of tag data are displayed according to the priority order on a display section of the image processing apparatus; and
control the communication interface to transmit one of the plurality of tag data and the plurality of tag identification information.

7. The intermediary apparatus according to claim 5, wherein the controller is further configured to:
convert the plurality of tag data in a mode which can be displayed on a display section of the image processing apparatus;
output the plurality of tag data which have been converted;
control the communication interface to transmit the plurality of tag data which have been converted to the image processing apparatus;
convert the tag data which has been acquired from the image processing apparatus via the communication interface to a mode which is usable in the service; and
control the communication interface to transmit the tag data which has been converted to the service.

8. The intermediary apparatus according to claim 5, wherein in a case that the controller is not capable of acquiring the tag list, the controller is configured to:
output a command for making the image processing apparatus receive an input of the tag data; and
control the communication interface to transmit the command to the image processing apparatus.

9. An intermediary apparatus configured to be connectable to an image processing apparatus and to a service configured to store electronic data which has been uploaded, via networks, the intermediary apparatus comprising:

a communication interface configured to be connectable to the image processing apparatus via a first network, and connectable to the service via a second network; and
a controller is configured to:
output first combination information, in which information for instructing the intermediary apparatus to distinguish one of success and failure of storage processing executed by the service which received the electronic data for storing the electronic data, and one of tag data and tag identification information for identifying the tag data are combined, in response to acquiring one of the tag data and the tag identification information;
control the communication interface to transmit the first combination information to the image processing apparatus;
acquire second combination information, which is transmitted from the image processing apparatus and in which the first combination information, upload notification information and upload result information are combined, the upload notification information including tagging request information for requesting to associate the tag data with the electronic data which has been uploaded to the service from the image processing apparatus, and the upload result information being transmitted to the image processing apparatus from the service and indicating at least one of success and failure of the storage processing, and
distinguish between success and failure of the storage processing in the service based on the upload result information included in the second combination information, in response to acquiring the second combination information;
output the tagging instruction information in response to acquiring the second combination information;
control the communication interface to transmit the tagging instruction to the service;
output distinction result information indicating at least one of success and failure of the storage processing; and
control the communication interface to transmit the distinction result information to the image processing apparatus thereby making the image processing apparatus notify the distinction result information.

10. An image processing apparatus configured to be connectable to an intermediary apparatus and to a service configured to store electronic data which has been uploaded, via networks, the image processing apparatus comprising:
a communication interface configured to be connectable to the intermediary apparatus and the service via the networks; and
a controller,
wherein the service is included in a plurality of services to which the image processing apparatus is connectable,
wherein the controller is configured to:
output server identification information for identifying the service to transmit to the intermediary apparatus from the communication interface,
control the communication interface to transmit, to the intermediary apparatus, tagging request information for requesting to associate tag data with electronic data which has been uploaded to the service from the image processing apparatus;
control the communication interface to transmit, to the intermediary apparatus, upload notification information indicating that the electronic data has been uploaded from the image processing apparatus to the service; and make the intermediary apparatus transmit, to the service identified by the service identification information, tagging instruction information for requesting to associate the tag data with the electronic data which has been uploaded from the image processing apparatus and stored in the service, in response to transmitting the service identification information, the tagging request information and the upload notification information from the communication interface to the intermediary apparatus,
wherein the intermediary apparatus includes a storage section configured to store first processing execution information which is necessary for transmitting the tagging instruction information to each of the plurality of services,
wherein the tagging instruction information has a specification unique to each of the services, and
wherein the controller is configured to make the intermediary apparatus transmit the tagging instruction information based on first processing execution information corresponding to the service identified by the service identification information.

11. The image processing apparatus according to claim 10, wherein the controller is configured to make the intermediary apparatus transmit, to the service, the tagging instruction information and electronic-data identification information, which is transmitted to the image processing apparatus from the service in which the electronic data has been stored successfully, for the service to identify the electronic data which has been stored in the service successfully, in response to transmitting the tagging request information and the upload notification information including the electronic data identification information to the intermediary apparatus via the communication interface.

12. The image processing apparatus according to claim 10, wherein the controller is configured to make the intermediary apparatus transmit, to the service, the tagging instruction information and electronic-data identification information, which is transmitted to the intermediary apparatus from the service in which the electronic data has been stored successfully, for the service to identify the electronic data which has been stored in the service successfully, in response to transmitting the tagging request information, the upload notification information, and the electronic data identification information to the intermediary apparatus via the communication interface.

13. The image processing apparatus according to claim 10, wherein the controller is configured to make the intermediary apparatus transmit the tagging instruction information to the service, in response to transmitting the upload notification information and one of the tag data and tag identification information for identifying the tag data to the intermediary apparatus from the communication interface, and
the tagging instruction information is information for requesting to associate one of the tag data which has been transmitted from the controller via the communication interface and tag data identified by the tag identification information which has been transmitted from the controller via the communication interface with electronic data which has been stored in the service.

14. The image processing apparatus according to claim 13, wherein the controller is configured to:
acquire one of a plurality of tag data including the tag data and a plurality of tag identification information including the tag identification information, which have been transmitted from the intermediary apparatus, for displaying on the image processing apparatus and for being selected; and make the intermediary apparatus transmit the tagging instruction information to the service, in response to transmitting the upload notification information and one of the tag data selected from the plurality of tag data in the image processing apparatus and the tag identification information selected from the plurality of tag identification information in the image processing apparatus, to the intermediary apparatus via the communication interface.

15. A service collaboration system configured to be connectable to a service configured to store electronic data which has been uploaded from the service collaboration system, the service collaboration system comprising:

an image processing apparatus configured to be connectable to the service via a network; and an intermediary apparatus configured to be connectable to the image processing apparatus and the service via the network, wherein the image processing apparatus comprising:
a first communication interface configured to be connectable to the intermediary apparatus and the service via the network; and
a first controller configured to control the first communication interface, wherein the intermediary apparatus comprising:
a second communication interface configured to be connectable to the image processing apparatus and the service via the network;
a second controller configured to control the second communication interface; and
a storage section, wherein the service is included in a plurality of services to which the service collaboration system is connectable, wherein the first controller is configured to:
output service identification information for identifying the service which has been selected in the image processing apparatus from among the services; and
control the first communication interface to transmit the service identification information to the intermediary apparatus, wherein the second controller is configured to:
acquire the service identification information transmitted from the image processing apparatus;
output upload-information request information for requesting upload information to the service identified by the service identification information;
control the second communication interface to transmit the upload-information request information to the service identified by the service identification information;
acquire the upload information which has been transmitted from the service identified by the service identification information; and
make the image processing apparatus execute upload the electronic data to the service identified by the service identification information based on the upload information which has been acquired, by controlling the second communication interface to transmit the upload information which has been acquired to the image processing apparatus, wherein the first controller is configured to:
control the first communication interface to transmit, to the intermediary apparatus, tagging request information for requesting to associate tag data with the electronic data which has been uploaded from the image processing apparatus to the service identified by the service identification information; and
control the first communication interface to transmit, to the intermediary apparatus, upload notification information indicating that the electronic data has been uploaded from the image processing apparatus to the service identified by the service identification information;

wherein the second controller is configured to:
acquire the tagging request information transmitted from the image processing apparatus;
acquire the upload notification information transmitted from the image processing apparatus;
output tagging instruction information for requesting to associate the tag data with the electronic data which has been uploaded from the image processing apparatus and stored in the service identified by the service identification information, in response to acquiring the tagging request information and the upload notification information; and
control the second communication interface to transmit the tagging instruction information to the service identified by the service identification information, wherein the storage section is configured to store first processing execution information which is necessary for transmitting the tagging instruction information to each of the services and second processing execution information which is necessary for transmitting the upload-information request information to each of the services, wherein the upload-information request information has a specification unique to each of the services, wherein the second controller is configured to:
acquire the second processing execution information from the storage section, in response to acquiring the service identification information; and
output the upload-information request information corresponding to the service identified by the service identification information based on the second processing execution information which has been acquired, wherein the tagging instruction information has a specification unique to each of the services, and wherein the second controller is configured to:
acquire the first processing execution information corresponding to the service identified by the service identification information from the storage section, in response to acquiring the service identification information, transmitting the upload information, and acquiring the tagging request information and the upload notification information; and
output the tagging instruction information based on the first processing execution information which has been acquired.

* * * * *